United States Patent
Homchaudhuri et al.

(10) Patent No.: US 9,781,673 B2
(45) Date of Patent: Oct. 3, 2017

(54) ADAPTIVE CONTROL OF RF LOW POWER MODES IN A MULTI-RATE WIRELESS SYSTEM USING DEVICE MODE

(71) Applicant: QUALCOMM Incorporated, San Diego, CA (US)

(72) Inventors: Sandip Homchaudhuri, San Jose, CA (US); Paul Husted, San Jose, CA (US); MeeLan Lee, Los Altos, CA (US); Srenik Mehta, Union City, CA (US); Kai Shi, San Jose, CA (US); Shahram Abdollahi-Alibeik, Los Gatos, CA (US); Zhanfeng Jia, Belmont, CA (US); Soraya Kasnavi, San Jose, CA (US); Ning Zhang, Saratoga, CA (US); David Kuochieh Su, Saratoga, CA (US); Subramania Sharma Thandaveswaran, Sunnyvale, CA (US); Kenneth Gainey, San Diego, CA (US); Ian David O'Donnell, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 14/287,670

(22) Filed: May 27, 2014

(65) Prior Publication Data
US 2015/0351032 A1  Dec. 3, 2015

(51) Int. Cl.
G06F 1/32 (2006.01)
H04W 52/02 (2009.01)

(52) U.S. Cl.
CPC ...... *H04W 52/0235* (2013.01); *G06F 1/3206* (2013.01); *G06F 1/3234* (2013.01); *H04W 52/0229* (2013.01); *Y02B 60/50* (2013.01)

(58) Field of Classification Search
CPC .... G06F 1/3293; G06F 1/3287; G06F 1/3278; H04W 52/0229; Y02B 60/50
See application file for complete search history.

(56) References Cited

U.S. PATENT DOCUMENTS

| | | | |
|---|---|---|---|
| 6,879,567 B2 * | 4/2005 | Callaway | G08C 17/00 370/311 |
| 7,941,682 B2 | 5/2011 | Adams | |

(Continued)

FOREIGN PATENT DOCUMENTS

| | | |
|---|---|---|
| WO | WO-2010123573 A1 | 10/2010 |
| WO | WO-2013022469 A1 | 2/2013 |

(Continued)

OTHER PUBLICATIONS

Gast, Matthew. 802.11 Wireless Networks: The Definitive Guide. N.p.: O'Reilly Media, 2005. Web. Ch. 8, Power Conservation.*

(Continued)

*Primary Examiner* — Jaweed A Abbaszadeh
*Assistant Examiner* — Brian J Corcoran
(74) *Attorney, Agent, or Firm* — Holland & Hart LLP

(57) ABSTRACT

Methods, systems, and devices are described for power conservation in a wireless communications system. In embodiments, power conservation may be achieved by adaptively controlling power modes of a wireless communication device, and implementing lower power modes with various modes of the device. According to one aspect, the mode of the device may be a beacon monitoring mode or a delivery traffic indication message (DTIM) mode. In such a mode, the device may receive a portion of a beacon in a first power mode. The device may transition to a second, different (e.g., higher) power mode using information contained in the received portion of the beacon as guidance.

24 Claims, 18 Drawing Sheets

(56) References Cited

U.S. PATENT DOCUMENTS

| | | | |
|---|---|---|---|
| 8,265,048 | B1 | 9/2012 | Donovan |
| 8,971,213 | B1 | 3/2015 | Hart |
| 2004/0002306 | A1 | 1/2004 | Haapoja et al. |
| 2004/0266493 | A1* | 12/2004 | Bahl ................ H04W 52/0277 455/574 |
| 2005/0138451 | A1 | 6/2005 | Simpson et al. |
| 2007/0133448 | A1* | 6/2007 | Gao ................ H04W 52/0216 370/311 |
| 2007/0206695 | A1 | 9/2007 | Ye et al. |
| 2008/0080597 | A1 | 4/2008 | Rofougaran |
| 2008/0165715 | A1 | 7/2008 | Liu |
| 2008/0220807 | A1* | 9/2008 | Patel ................ H04B 1/0003 455/524 |
| 2008/0298290 | A1* | 12/2008 | Wentink ........... H04W 52/0216 370/311 |
| 2009/0010191 | A1* | 1/2009 | Wentink ........... H04W 52/0216 370/311 |
| 2009/0073940 | A1 | 3/2009 | Shrivastava et al. |
| 2009/0170509 | A1 | 7/2009 | Cai et al. |
| 2009/0245125 | A1 | 10/2009 | Horisaki et al. |
| 2010/0014500 | A1 | 1/2010 | Lee et al. |
| 2010/0067421 | A1* | 3/2010 | Gorokhov ......... H04W 52/0206 370/311 |
| 2010/0067422 | A1* | 3/2010 | Kadous ............ H04W 52/0229 370/311 |
| 2010/0080134 | A1 | 4/2010 | Maniatopoulos et al. |
| 2010/0103810 | A1 | 4/2010 | Kloos et al. |
| 2010/0215011 | A1 | 8/2010 | Pan et al. |
| 2010/0265929 | A1 | 10/2010 | Liao et al. |
| 2010/0296567 | A1 | 11/2010 | Qiu et al. |
| 2010/0322126 | A1* | 12/2010 | Krishnaswamy ..... H04W 48/16 370/311 |
| 2011/0065413 | A1* | 3/2011 | Singer ............... H04W 52/0229 455/343.2 |
| 2012/0155347 | A1 | 6/2012 | Husted et al. |
| 2012/0250731 | A1* | 10/2012 | Taghavi Nasrabadi ............ H04W 88/06 375/147 |
| 2012/0324315 | A1 | 12/2012 | Zhang et al. |
| 2013/0201838 | A1 | 8/2013 | Homchaudhuri et al. |
| 2013/0235796 | A1* | 9/2013 | Kwon ............... H04W 72/0406 370/328 |
| 2013/0279353 | A1 | 10/2013 | Ji et al. |
| 2013/0343250 | A1 | 12/2013 | Homchaudhuri et al. |
| 2013/0343252 | A1 | 12/2013 | Chakraborty et al. |
| 2014/0078949 | A1* | 3/2014 | Chu ................. H04W 52/0209 370/311 |
| 2014/0086124 | A1 | 3/2014 | Knowles |
| 2014/0086128 | A1 | 3/2014 | Gomez et al. |
| 2014/0098729 | A1 | 4/2014 | Chhabra et al. |
| 2014/0204822 | A1* | 7/2014 | Park ................. H04W 68/025 370/311 |
| 2015/0036575 | A1* | 2/2015 | Li .................... H04W 52/0216 370/311 |
| 2015/0085767 | A1 | 3/2015 | Einhaus et al. |
| 2015/0103767 | A1 | 4/2015 | Kim et al. |
| 2015/0139002 | A1 | 5/2015 | Lee et al. |
| 2015/0346807 | A1 | 12/2015 | Homchaudhuri et al. |

FOREIGN PATENT DOCUMENTS

| | | |
|---|---|---|
| WO | WO-2013135475 A1 | 9/2013 |
| WO | WO-2014003463 A1 | 1/2014 |

OTHER PUBLICATIONS

S. Catreux, V. Erceg, D. Gesbert and R. W. Heath, "Adaptive modulation and MIMO coding for broadband wireless data networks," in IEEE Communications Magazine, vol. 40, No. 6, pp. 108-115, Jun. 2002.*

"802.11 Wireless Networks: The Definitive Guide, 2nd Edition" Ch. 3, Sec. 3, Gast, Matthew. N.p.: n.p., n.d. Safari. O'Reilly Media, Inc., Apr. 25, 2005. Web. Nov. 17, 2016.<https://www.safaribooksonline.com/library/view/80211-wireless-networks/0596100523/>.*

"802.11 Wireless Networks: The Definitive Guide, 2nd Edition" Ch. 3, Sec. 2, Gast, Matthew. N.p.: n.p., n.d. Safari. O'Reilly Media, Inc., Apr. 25, 2005. Web. Nov. 17, 2016. <https://www.safaribooksonline.com/library/view/80211-wireless-networks/0596100523/>.*

ISA/EPO, Partial International Search Report of the International Searching Authority, Int'l Appl. No. PCT/US2015/031693, Sep. 30, 2015, European Patent Office, Rijswijk, NL, 5 pgs.

ISA/EPO, International Search Report and Written Opinion of the International Searching Authority, Int'l Appl. No. PCT/US2015/031693, Nov. 9, 2015, European Patent Office, Rijswijk, NL, 14 pgs.

GAST, "Chapter 15, Section 3: TGnSync," 802.11 Wireless Networks: The Definitive Guide, Second Edition, Apr. 2005, 13 pgs., URL: http://techbus.safaribooksonline.com/print?xmlid=0596100523%2Fwireless802dot112-CHP-15-SECT-3, O'Reilly Media, Inc., Sebastopol, CA.

Ahmadi et al., "LTE—advanced a Practical Systems Approach to Understanding 3GPP LTE Releases 10 and 11 Radio Access Technologies," Amsterdam: Elsevier, 2014, 13 pgs., Safari Books Online, Oct. 10, 2013, Web. Sep. 8, 2016.

Sesia et al., "LTE—the UMTS Long Term Evolution: From Theory to Practice," Chichester, West Sussex, U.K, Wiley, 2011, 7 pgs., Safari Books Online, Sep. 6, 2011, Web. Sep. 8, 2016.

* cited by examiner

ADAPTIVE CONTROL OF RF LOW POWER MODES IN A MULTI-RATE WIRELESS SYSTEM USING DEVICE MODE

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of network devices such as access points (APs) that can support communication for a number of wireless devices. A wireless device may communicate with a network device bidirectionally. For example, in a wireless local area network (WLAN), a station (STA) may communicate with an associated AP via downlink and uplink. The downlink (or forward link) refers to the communication link from the AP to the station, and the uplink (or reverse link) refers to the communication link from the station to the AP. Additionally, a wireless communications network may include a number of network devices such as base stations (BSs) that can support communication for a number of wireless devices.

There may be cases in which a wireless communication device (e.g., station) may benefit from controlling power modes, allowing the device to power down or off a component, such as a radio component, and thereby reduce power consumption. In general, power saving is an important aspect of mobile communication devices because such devices are limited to an amount of power provided by a battery or batteries included in the device. Therefore, power conservation techniques that are simple to implement and may provide increased opportunities to reduce power consumption are desirable.

SUMMARY

The described features generally relate to various improved systems, methods, and/or apparatuses for power conservation in a wireless communications system. Power conservation may be achieved by adaptively controlling power modes of a wireless communication device, and implementing lower power modes with various modes of the device. According to one aspect, the mode of the device may be a beacon monitoring mode or a delivery traffic indication message (DTIM) mode. In such a mode, the device may receive a portion of a beacon in a first power mode. The device may transition to a second, different (e.g., higher) power mode using information contained in the received portion of the beacon as guidance.

According to another aspect, the mode of the wireless communication device may be a transmission mode in which a frame is to be transmitted. In such a mode, the device may transmit the frame in a power mode using a modulation and coding scheme (MCS) value of the frame as guidance. Alternatively or additionally, the device may transmit the frame in a power mode using a frame type of the frame to be transmitted as guidance.

According to another aspect, the mode of the wireless communication device may be a background scan mode, such as scanning for nearby access points (APs) or neighboring devices. In such a mode, the device may perform a background scan in a relatively low power mode.

A method of adaptive power control for a wireless communication device is described. In one configuration, the method may involve: receiving a portion of a beacon in a first power mode of the device; and, transitioning to a second power mode based on an information element (IE) in the received portion of the beacon. The second power mode may be a different (e.g., higher) power mode than the first power mode.

In some aspects, the method may involve determining the IE in the beacon to be a traffic indication bit; and, determining that the traffic indication bit is set. Transitioning to the second power mode may be performed based on determining that the traffic indication bit is set. In some aspects, the traffic indication bit may be a delivery traffic indication message (DTIM) bit or a traffic indication map (TIM) bit. In such aspects, the method may involve receiving data in the second power mode of the device when the traffic indication bit is a DTIM bit. Alternatively or additionally, the method may involve transmitting a power save poll (PS-Poll) or a null data frame in the second power mode of the device when the traffic indication bit is a TIM bit.

In some aspects, the method may involve: initiating transitioning to the second power mode upon determining that the traffic indication bit is set; and, ignoring a remainder of the beacon after the traffic indication bit. In such aspects, the method may involve completing transition to the second power mode by an end of a distributed inter-frame space (DIFS) following a termination of the beacon.

In some aspects, the method may involve: receiving a remainder of the beacon after the traffic indication bit; and, initiating transitioning to the second power mode upon termination of the beacon. In such aspects, the method may involve completing transition to the second power mode by an end of a distributed inter-frame space (DIFS) following a termination of the receiving of the beacon.

In some aspects, the method may involve: identifying a modulation and coding scheme (MCS) value of a most recent reception of data from an access point (AP) associated with the beacon; and, transmitting a power save poll (PS-Poll) in a third power mode of the device when the identified MCS value is compatible with the third power mode and the traffic indication bit is a traffic indication map (TIM) bit. The third power mode may be a lower power mode than the second power mode.

In some aspects, transitioning to the second power mode may involve switching to a main synthesizer routed to each of a plurality of transmission/reception (Tx/Rx) chains associated with a modem for the second power mode from a plurality of local (e.g., lower-powered) synthesizers routed respectively to one of the plurality of Tx/Rx chains for the first power mode. In other aspects, transitioning to the second power mode may involve switching from a main synthesizer routed to each of a plurality of transmission/reception (Tx/Rx) chains associated with a modem for the first power mode to a plurality of local (e.g., lower-powered) synthesizers routed respectively to one of the plurality of Tx/Rx chains for the second power mode.

In some aspects, the method may involve: determining that a frame is to be transmitted by the device; and, transmitting the frame in the first power mode of the device when a modulation and coding scheme (MCS) value of the frame is compatible with the first power mode. In such aspects, the method also may involve transmitting the frame in the second power mode of the device when the MCS value of the frame is not compatible with the first power mode.

In some aspects, the method may involve: determining a frame type of a frame to be transmitted; and, transmitting the frame in the first power mode of the device based on the determined frame type. In such aspects, the determined frame type may be a management frame.

In some aspects, the method may involve performing a background scan in the first power mode of the device. In such aspects, performing the background scan in the first power mode may involve operating components of the device involved in the background scan in the first power mode.

In some aspects, the method may involve determining that the device is in a delivery traffic indication message (DTIM) mode.

A wireless communication device is described. In one configuration, the device may include: a receiver configured to receive a portion of a beacon in a first power mode of the device; and, a power controller configured to transition to a second power mode based at least in part on an information element (IE) in the received portion of the beacon. The second power mode may be a different (e.g., higher) power mode than the first power mode.

In some aspects, the device may include a beacon IE determiner configured to: determine the IE in the beacon to be a traffic indication bit; and, determine that the traffic indication bit is set. The power controller may be configured to transition to the second power mode based on the determination that the traffic indication bit is set. In such aspects, the receiver may be configured to receive data in the second power mode of the device when the traffic indication bit is a delivery traffic indication message (DTIM) bit. Alternatively or additionally, the device may include a transmitter configured to transmit a power save poll (PS-Poll) or a null data frame in the second power mode of the device when the traffic indication bit is a traffic indication map (TIM) bit. Alternatively or additionally, the device may include: a modulation and coding scheme (MCS) determiner configured to determine an MCS value of a most recent reception of data from an access point (AP) associated with the beacon; and, a transmitter configured to transmit a power save poll (PS-Poll) in a third power mode of the device when the identified MCS value is compatible with the third power mode and the traffic indication bit is a traffic indication map (TIM) bit. The third power mode may be a lower power mode than the second power mode.

An apparatus for adaptive power control for a wireless communication device is described. In one configuration, the apparatus may include means for receiving a portion of a beacon in a first power mode of the device; and, means for transitioning to a second power mode based at least in part on an information element (IE) in the received portion of the beacon. The second power mode may be a different (e.g., higher) power mode than the first power mode. Further, the apparatus may include means configured to perform various additional functions of the methods described above and as described further herein.

A computer program product is described. In one configuration, the computer program product may be a non-transitory computer-readable medium including instructions stored thereon. The instructions may be executable by a computer to: receive a portion of a beacon in a first power mode of the device; and, transition to a second power mode based at least in part on an information element (IE) in the received portion of the beacon. The second power mode may be a different (e.g., higher) power mode than the first power mode. Further, the stored instructions may be executable by the computer to perform various additional functions of the methods described above and as described further herein.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
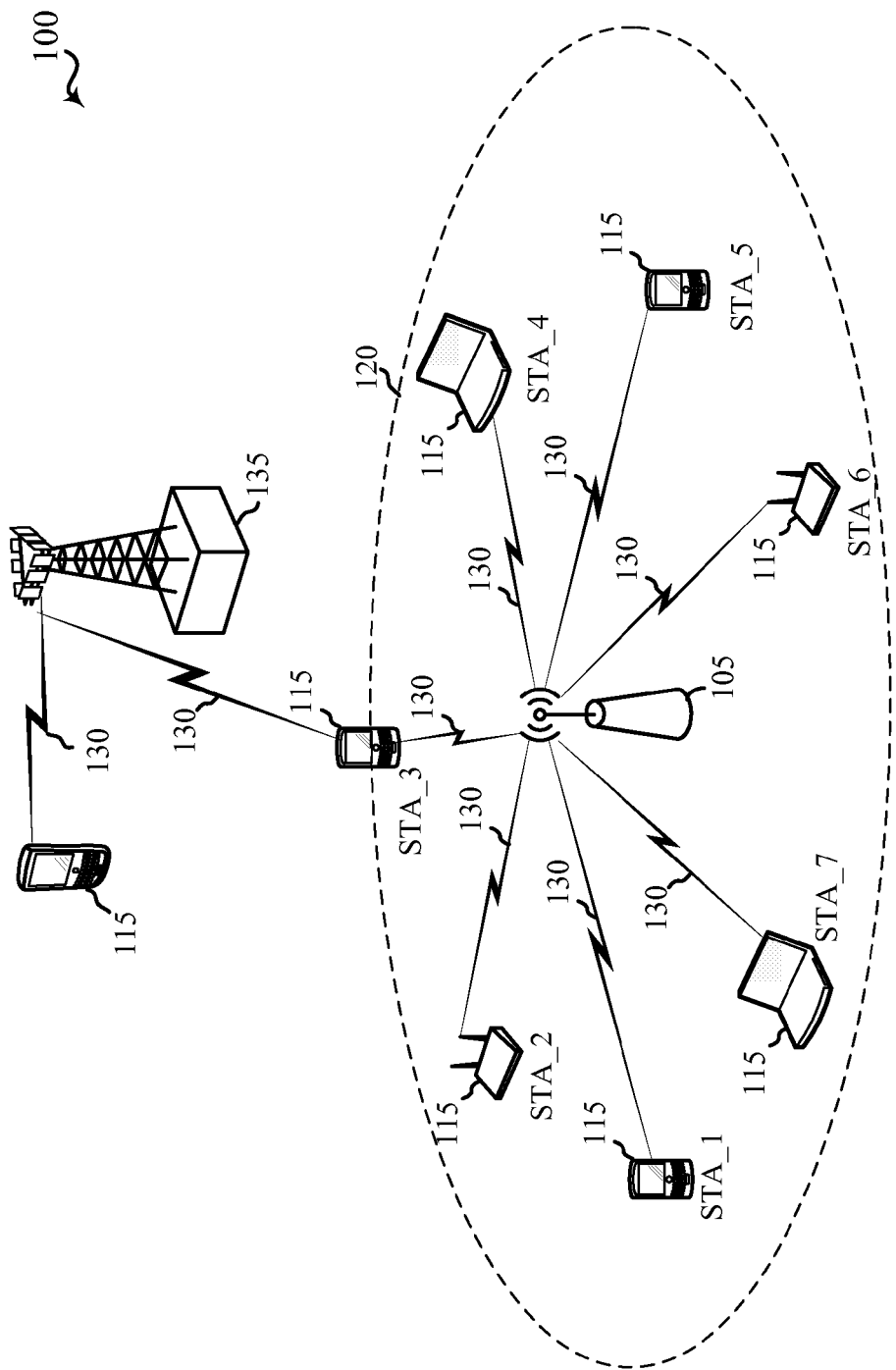
FIG. 1 shows a diagram that illustrates an example of a wireless communications system according to various embodiments.

Adaptive power control for a wireless communication device, such as a WLAN station or a Long Term Evolution (LTE) user equipment (UE), is described. In various embodiments, the device may be in a beacon monitoring or a delivery traffic indication message (DTIM) mode. The device may receive a portion of a beacon in a first power mode. Contrary to conventional DTIM mode operation in which beacons are received by a device in a high power mode, the first power mode is a low or reduced power mode. Based on an information element (IE) in the received portion of the beacon, the device may transition to a second power mode, wherein the second mode is a higher power mode than the first power mode. Thus, the device may adaptively control power modes so that the first, lower power mode is used for monitoring for and/or receiving the beacon (or portion thereof), and the second, higher power mode is used when the IE indicates that the higher power mode is appropriate or desired. As used herein, "high power mode" or "higher power mode" and "low power mode" or "lower power mode" are relative to each other, with no set values or specific power ratio, and may be determined in accordance with various implementations. Further, a high/higher power mode and a low/lower power may involve a respective range of power values and/or multiple distinct power values rather than a single set power value.

For example, the device may determine that the IE in the received portion of the beacon is a traffic indication bit, such as a DTIM bit or a traffic indication map (TIM) bit. The device may determine that the traffic indication bit is set, and may transition to the second power mode when the traffic indication bit is set. The device may receive data in the second power mode when the traffic indication bit is a DTIM bit and is set. Alternatively or additionally, the device may transmit a power save (PS) poll or a null data frame in the second power mode when the traffic indication bit is a TIM bit and is set.

Further, the device may initiate transitioning to the second power mode upon determining that the traffic indication bit is set, and may ignore a remainder of the beacon after the traffic indication bit. Alternatively, the device may receive a remainder of the beacon after the traffic indication bit, and may initiate transitioning to the second power mode upon termination of the beacon. In either case, the transition to the second power mode may be completed by an end of a distributed inter-frame space (DIFS) following a termination of the receiving of the beacon, for example, to avoid an interruption of operation or service.

These and other features of various embodiments are described in further detail below. The power conservation techniques presented herein are generally described in connection with WLANs for simplicity. A WLAN (or Wi-Fi network) may refer to a network that is based on the protocols described in the various IEEE 802.11 standards (e.g., 802.11a/g, 802.11n, 802.11ac, 802.11ah, etc.). The same or similar techniques, however, may be used for various other wireless communications systems such as cellular wireless systems, peer-to-peer wireless communications, ad hoc networks, satellite communications systems, and other systems. The terms "system" and "network" may be used interchangeably.

Thus, the following description provides examples, and is not limiting of the scope, applicability, or configuration set forth in the claims. Changes may be made in the function and arrangement of elements discussed without departing from scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a WLAN 100 or Wi-Fi network is shown that may be configured to provide enhanced power conservation. The WLAN 100 includes an AP 105 and multiple associated stations 115. In this example, there are shown seven (7) stations or STAs 115, which are identified as STA_1, STA_2, STA_3, STA_4, STA_5, STA_6, and STA_7. The WLAN 100, however, may have more or fewer stations 115 than those shown in FIG. 1 since the number shown is simply for illustrative purposes. The AP 105 and the associated stations 115 may represent a basic service set (BSS). The various stations 115 in the BSS are able to communicate with one another through the AP 105. Also shown is a coverage area 120 of the AP 105, which may represent a basic service area (BSA) of the WLAN 100. Although not shown in FIG. 1, the BSS associated with the WLAN 100 is typically connected to a wired or wireless distribution system (DS) that allows multiple APs to be connected in an extended service set.

The AP 105 is configured to communicate bi-directionally with each of the stations 115 using transmissions 130. The transmissions 130 may include downlink transmissions (e.g., beacon frames) that are sent from the AP 105 to a station 115 as well as uplink transmissions (e.g., acknowledgments or ACK frames) that are sent from a station 115 to the AP 105. Typically, the AP 105 is configured to broadcast its downlink transmissions to the stations 115 that are within the coverage area 120.

In situations where a station 115 does not expect to actively transmit or receive data, it may be beneficial for the station 115 to power down certain components, such as radio components, in order to reduce power consumption of the station. Various wireless standards, such as the 802.11 standards, define a power-save mode for stations 115. In power-save mode, a station 115 may choose to enter a network sleep mode for a beacon interval, waking periodically to receive beacon frames that include a delivery traffic indication message (DTIM). This mode may be referred to as a beacon monitoring mode or a DTIM mode. In some implementations, a DTIM may be transmitted periodically in beacon frames, such as, for example, every other beacon frame, and a station 115 in network sleep mode may awaken to receive every other beacon frame but otherwise remain asleep and may thereby reduce power consumption. To initiate a power-save mode, a station 115 may transmit a notification to the AP 105, so that the AP 105 will know how to handle data traffic destined for the station 115. In some examples, the AP 105 and one of the stations 115 may be configured to implement communications related to entry of a power save mode by a station 115.

Additionally, as shown in FIG. 1, a station or stations 115 (e.g., STA_3) may be configured to communicate with a base station 135 (e.g., eNodeB, etc.) via a different radio access technology, such as Long Term Evolution (LTE), for example, either concurrently with or at different times than WLAN communications with the AP 105. As illustrated, the stations 115 may be various wireless communication devices or user equipment (UEs) such as cell phones, smartphones, computers, laptops, modems, etc.

The station(s) 115 may be configured to adaptively control power modes thereof. As described above, a station 115 (wireless communication device) may implement adaptive control of its power modes based on a particular mode (e.g., DTIM mode) the station is in (or is going into, such as receiving, transmitting, scanning, etc.).

Figure 2A:
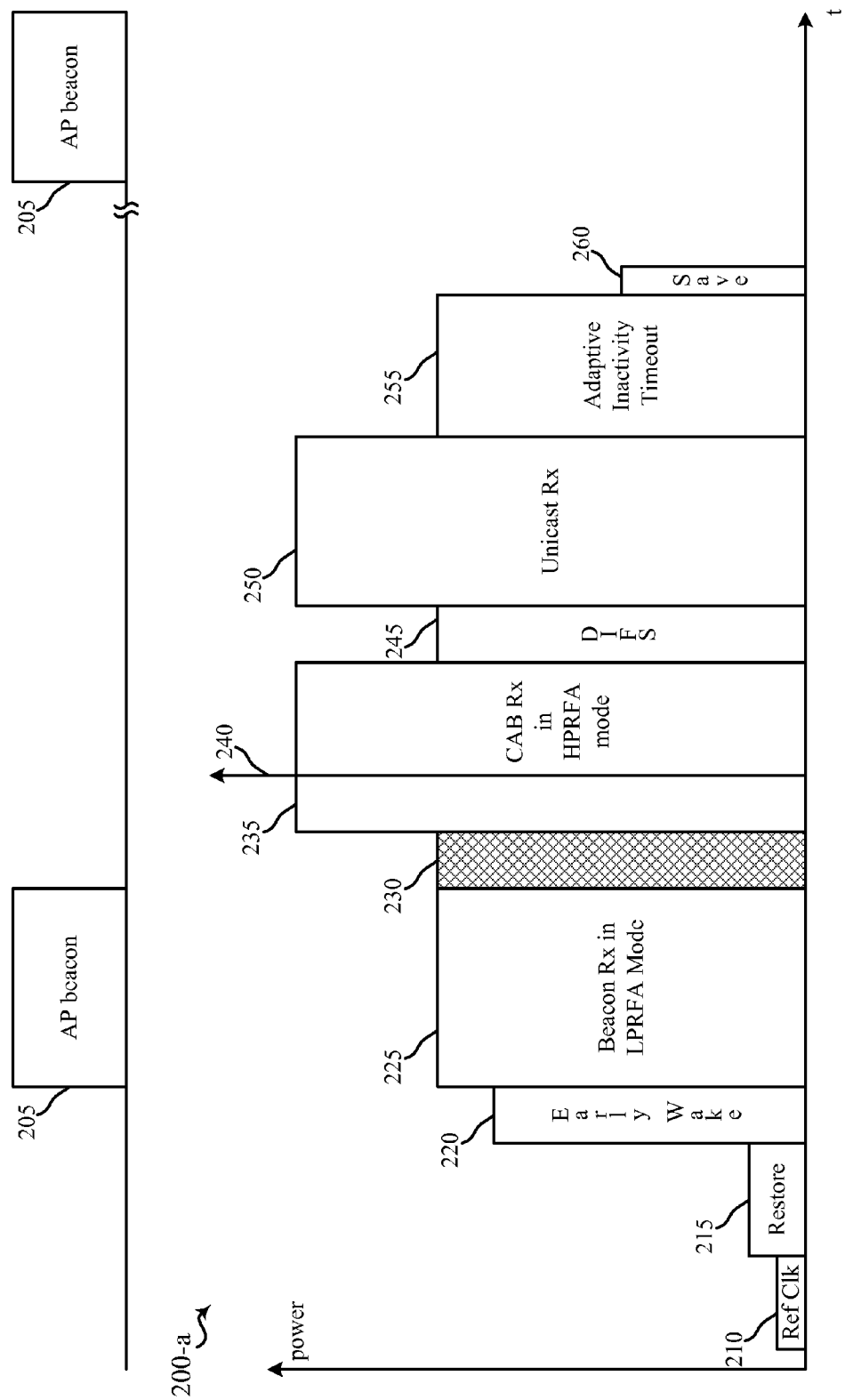
FIG. 2A shows a timeline for a wireless communication device in a beacon monitoring or a delivery traffic indication message (DTIM) mode.

With reference now to FIG. 2A, a timeline 200-*a* for a wireless communication device (e.g., a WLAN station 115 or LTE UE described with reference to FIG. 1) in DTIM mode is illustrated with reference to beacons 205 transmitted periodically from an AP (e.g., AP 105 described with reference to FIG. 1). Power consumption of the device is depicted graphically with respect to various stages of the DTIM mode. Although no power consumption is depicted outside of the stages shown, it should be understood that some (e.g., minimal) consumption of power occurs when the device is asleep.

As the device in network sleep (e.g., asleep or in a sleep mode) begins to wake up to receive a beacon 205, the device may need to restore its internal clock. Initially, the device may request a reference clock signal (e.g., from the AP 105) at 210, and use the reference clock signal to restore its local clock at 215 (e.g., allowing time for the WLAN crystal oscillator to settle). The device may proceed to an early wake stage at 220, which may be an adaptive time period to compensate for inaccuracy of the local clock (e.g., clock drift). Next, the device may receive the anticipated beacon 205 in a low or reduced power mode (e.g., a low power radio frequency/analog (LPRFA) mode) at 225, where the expected modulation and coding scheme (MCS) value may be MCS0 or complementary code keying (CCK) modulation for the beacon 205. Thus, stages 210-225 illustrated in FIG. 2A may be performed by the device in the low power mode.

However, the received beacon 205 may include an information element (IE) that may be detected or otherwise determined to indicate that the device should transition from the low power mode to a high or increased power mode (e.g., a high power radio frequency/analog (HPRFA) mode). For example, the IE may be a traffic indication bit, such as a DTIM bit, that is set (e.g., DTIM=1). Alternatively or additionally, the traffic indication bit may be a TIM bit that is set (e.g., TIM=1). In such cases, the device may transition from the low power mode to the high power mode during a distributed coordinated function (DCF) inter-frame space (DIFS) 230 following the end or termination of the beacon. As known in the art, a length of the DIFS may be determined in accordance with a standard, and may be 34 μs, for example. In this case, the DIFS 230 may be referred to as a blackout period during which no receptions or transmissions by the device occur. Thus, the device may complete its transition from the low power mode to the high power mode during the DIFS, or at least by the end of the DIFS, so that no interruption of operation of the device or service is perceived by a user of the device, which otherwise may negatively impact the user's experience. Thus, the DIFS/blackout period 230 may provide a safe period for the power mode transition to occur. That is, the power mode transition may occur during the DIFS/blackout period 230 without risk of losing data transmitted to the device.

When the DTIM bit is set, the device may operate in the high power mode at 235 to receive data, for example, in anticipation of receiving such content after beacon (CAB) reception (Rx) traffic (e.g., packet(s)) at a highest MCS value. When the TIM bit is set, the device may operate in the high power mode at 240 to generate a high precision transmission (Tx) for a power save poll (PS-Poll) or a null data frame. For example, the PS-Poll may be transmitted at MCS0 and a highest transmission power of the device. In some embodiments, the Rx power may be slightly less than the Tx power.

When the TIM bit is set, the device may transmit a configurable number of PS-Polls or null data frames before entering a listening stage at 245. When the DTIM bit is set, the device may receive the CAB traffic and then enter the listening stage. A length of the listening stage may be another DIFS (e.g., 34 μs) after which the device may receive unicast Rx traffic (one or a series of events) at 250. As illustrated in this example, an end of the unicast Rx traffic may be followed by another listening stage, such as an adaptive inactivity timeout period, at 255. Upon expiration of the inactivity timeout period, the device may begin to return to network sleep with a central processing unit (CPU) save interrupt at 260. As such, the device may then remain in the sleep mode until the device wakes up for a subsequent beacon from the AP 105.

Figure 2B:
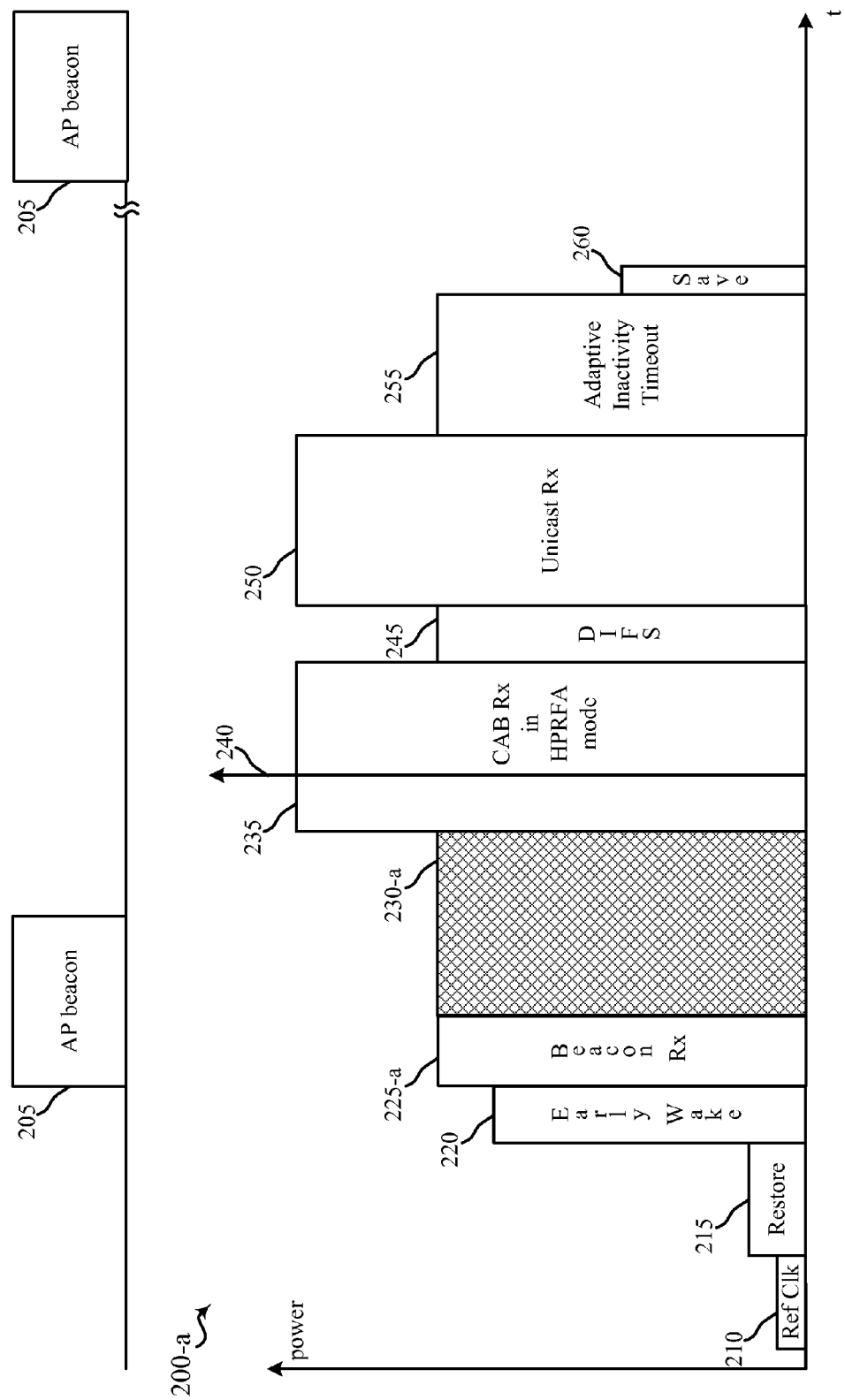
FIG. 2B shows another timeline for a wireless communication device in a beacon monitoring or a DTIM mode.

Similar to FIG. 2A, FIG. 2B illustrates a timeline 200-*b* for a wireless communication device (e.g., a WLAN station 115 or LTE UE described with reference to FIG. 1) in DTIM mode with reference to beacons 205 transmitted periodically from an AP (e.g., AP 105 described with reference to FIG. 1). The various stages 210, 215, 220, 235, 240, 245, 250, 255 and 260 may be as described above with respect to FIG. 2A.

However, the timeline 200-*b* illustrates that the device may immediately act upon a detected or determined traffic indication bit that is set (e.g., DTIM=1 and/or TIM=1). The device may ignore a remainder of the beacon 205 that occurs after the DTIM and TIM IEs. As such, the device may begin its transition from the low power mode to the high power mode immediately after the traffic indication bits are detected/determined. This creates a larger window or cushion for a safe transition between power modes to occur, resulting in a blackout period 230-*a* (e.g., with a length of 600 to 1200 μs) including with a DIFS (e.g., 34 μs). The transition to the high power mode may be completed during the blackout period 230-*a* (e.g., at least by the end of the DIFS) to protect the user's experience.

Figure 3:
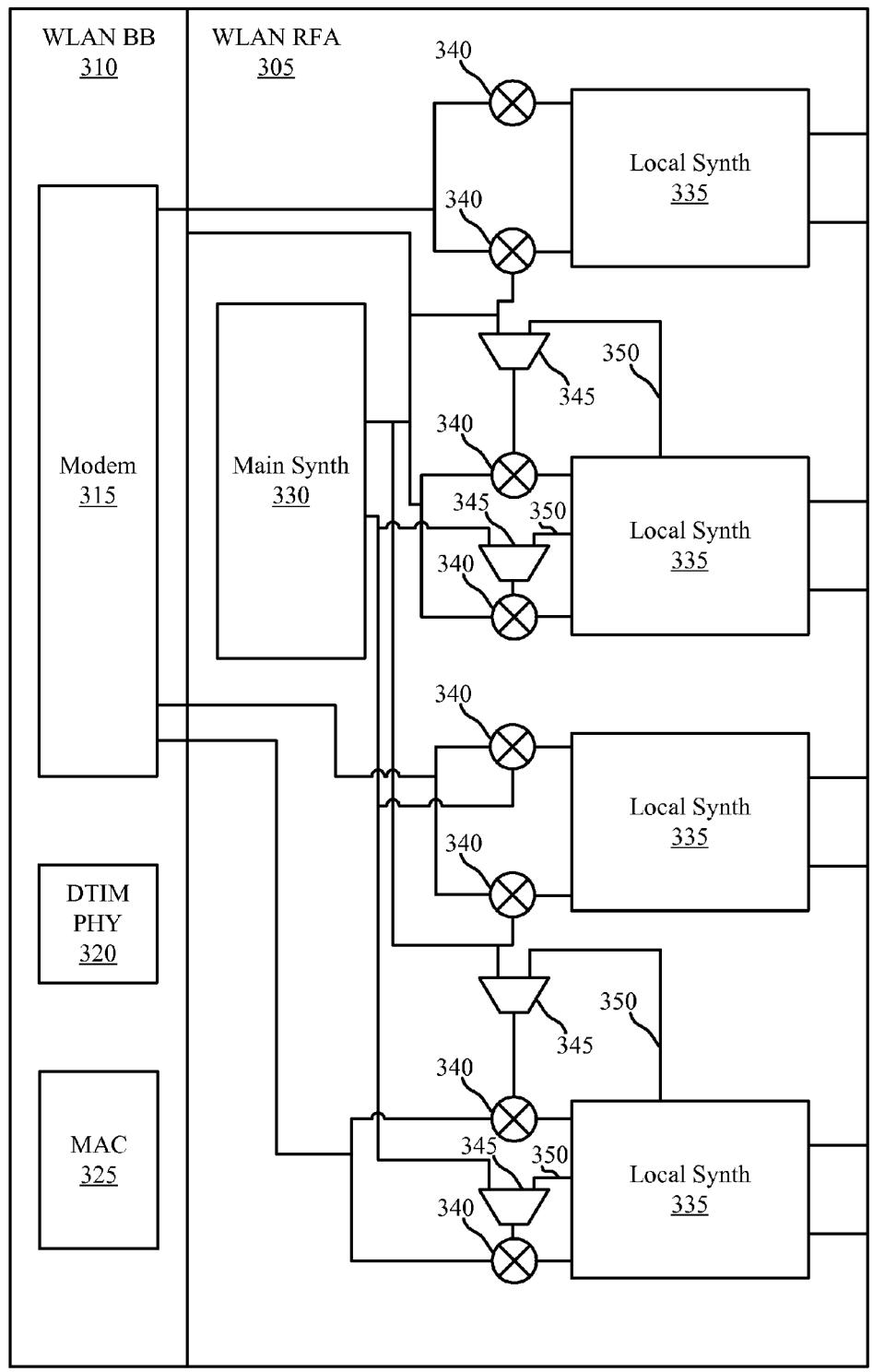
FIG. 3 shows a block diagram of an example of an arrangement of components that may be employed by a wireless communication device to transition between power modes.

FIG. 3 shows a block diagram 300 of an example of an arrangement of components that may be employed by a wireless communication device 115, such as a WLAN station 115 or LTE UE to transition between power modes. The components may be part of a WLAN radio frequency/analog (RFA) circuitry 305. The block diagram 300 also includes a WLAN baseband (BB) circuitry 310 for context. The WLAN BB circuitry 310 shown in FIG. 3 includes a modem 315, a DTIM physical (PHY) layer 320 and a media access control (MAC) layer 325.

The WLAN RFA circuitry 305 shown in FIG. 3 includes a high power (HP) or main synthesizer 330, which may provide excellent phase noise but consumes a lot of power, and a plurality of low power (LP) or local synthesizers 335. As used herein, "high power" or "higher power" and "low power" or "lower power" are relative to each other, with no set values or specific power ratio, and may be determined in accordance with various implementations. Further, high/higher power and low/lower power may involve a respective range of values and/or multiple distinct values rather than a single set value. Local oscillator (LO) routing from the main synthesizer 330 to mixers 340 of each Rx/Tx chain is relatively long, thus consuming a lot of power to drive LO distribution.

The local synthesizers 335 may have lower phase noise (PN) and inter-carrier interference (ICI) requirements than the main synthesizer 330. The lower PN and ICI requirements may be achieved with a ring oscillator or a relatively small LC tank (LC circuit, resonant circuit, tuned circuit, etc.). Such a voltage controlled oscillator (VCO) may run from 2.4 GHz to 6 GHz and may support dual bands (e.g., 11a/b/g/n/ac). Such a relatively small sized VCO allows the VCO to be located near the Rx/Tx mixers 340, thus limiting the LO routing from the local synthesizers 335 to the mixers 340 of each Rx/Tx chain and reducing power consumption for LO distribution.

The LO (e.g., VCO) of the local synthesizers 335 may be multiplexed with the LO of the main synthesizer 330, for example, via multiplexers 345. In-phase and quadrature components 350 from the VCO of the local synthesizers 335 may be provided directly to the multiplexers 345, thus bypassing LO distribution and further reducing power consumption.

The arrangement of components of the WLAN RFA circuitry 305 described above thus may provide a means for adaptively switching or transitioning between high and low power modes of the associated wireless communication device 115. Switching from the main synthesizer 330 routed to each of a plurality of transmission/reception (Tx/Rx) chains associated with the modem 315 to the local, lower-powered synthesizers 335 routed respectively to one of the plurality of Tx/Rx chains may switch/transition the device 115 from a high power mode to a low power mode. Conversely, switching to the main synthesizer 330 from the local, lower-powered synthesizers 335 may switch/transition the device 115 from the low power mode to the high power mode.

The arrangement of components of the WLAN RFA circuitry 305 described above is only an example of an implementation of a technique that may be employed to transition between power modes of a wireless communication device. Further, it should be understood that the block diagram 300 is only a basic illustration and does not include all circuitry or components that may be employed. Other techniques may be employed as well. For example, adaptively switching/transitioning between power modes of a device may involve changing a voltage source of a phase locked loop (PLL), a synthesizer, or both. Alternatively or additionally, the switching/transitioning may involve turning off (or on) a low dropout regulator (LDO) of a PLL, an LDO of a synthesizer, or both. Alternatively or additionally, the switching/transitioning may involve changing a bias current to a high performance circuit or circuits.

The transitions between power modes described herein may be performed almost seamlessly, but may cause or otherwise result in a slight glitch. The glitch may translate into transient phase errors, which may translate into elevated EVM transients. Therefore various mitigation techniques may be employed to reduce or even eliminate the potential effects of the glitch. For example, the bandwidth of the synthesizer loop may be increased before the power mode switch, which may result in a faster settling of the VCO and sooner stabilization of the phase error. Alternatively or additionally, a lower MCS rate (less than the MCS rate of the HPRFA mode) for the transition point to absorb the glitch within the EVM constraints of the adopted MCS rate. Alternatively or additionally, for a fixed or systematic glitch (or a portion thereof), a pre-determined phase adjustment may be applied to compensate for the glitch. Other mitigation techniques may be suitable as well. Any residual phase error may be corrected by pilot tracking or by a decision-feedback (DF) equalizer. The phase error caused by the glitch may be mitigated, for example, to a point at which the phase error may be imperceptible for lower MCS rates. Thus, transitioning from the HPRFA mode to the LPRFA mode may be preferable in some cases.

Figure 4A:
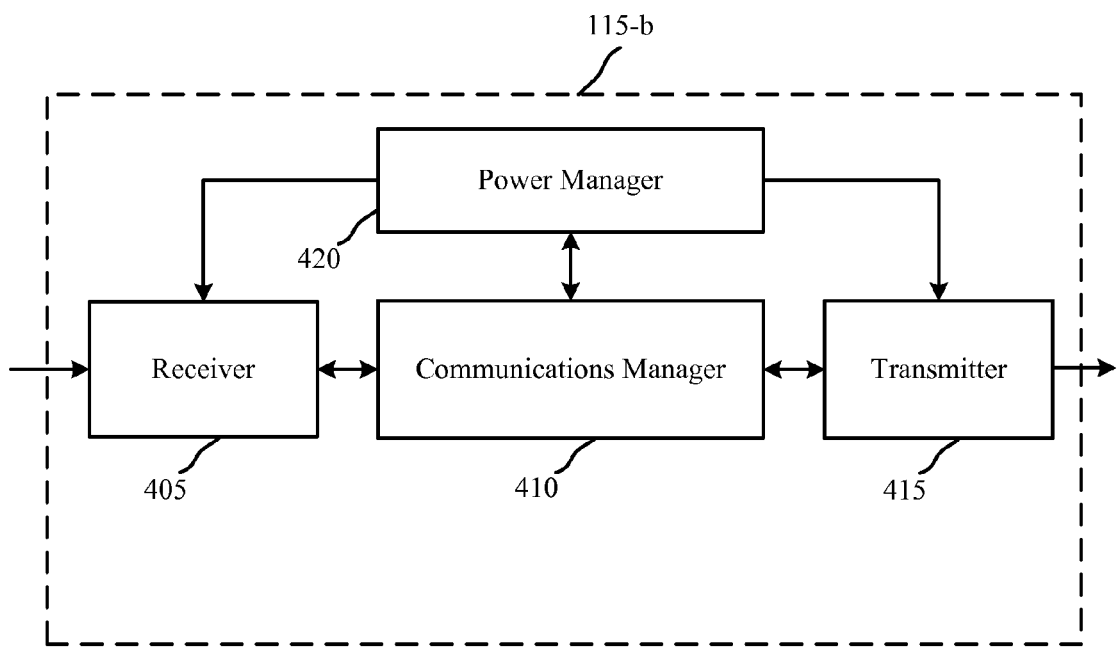
FIG. 4A shows a block diagram of an example of a wireless communication device.

With reference now to FIG. 4A, a block diagram 400-a illustrates a wireless communication device or user equipment (UE) 115-b that may be configured to adaptively switch or transition between power modes in accordance with various embodiments. The device 115-b may be an example of various aspects of the stations 115 described with reference to FIG. 1, and may include circuitry such as described with respect to FIG. 3. The device 115-b, or portions thereof, may also be a processor. The device 115-b may include a receiver 405, a communications manager 410, a transmitter 415 and a power manager 420. Each of these components may be in communication with each other.

The components of the device 115-b may, individually or collectively, be implemented with an application-specific integrated circuit(s) (ASIC(s)) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 405 may receive communications from other devices, such as other devices 115 and/or the AP 105 described with reference to FIG. 1. The transmitter 415 may send communications from the device 115-b to other devices 115 and/or the AP 105. The communications manager 410 may be configured to manage such communications via the receiver 405 and/or the transmitter 415. Further, the communications manager 410 may be configured to determine an operating mode of the device 115-b. Based on the determined operating mode, the power manager 420 may be configured to determine a desired power mode and implement the desired power mode for the device 115-b by switching/transitioning between power modes. For example, the power manager 420 may communicate with the receiver 405, the communications manager 410 and/or the transmitter 415 to turn on/off such components, or components thereof, to change voltages and/or currents supplied thereto, or to otherwise alter the power consumption of the device 115-b in operation.

In some embodiments, the receiver 405 may be means for receiving a beacon or a portion thereof. In some embodiments, the power manager 420, either alone or in combination with the communications manager 410, may be means for transitioning from one power mode to another power mode. Further, the receiver 405, the communications manager 410, the transmitter 415 and/or the power manager 420, either alone or in various combinations, may be means for performing any of the functions or operations described above with respect to FIGS. 2A, 2B and/or 3, or described below with respect to FIGS. 9-14, for example.

Figure 4B:
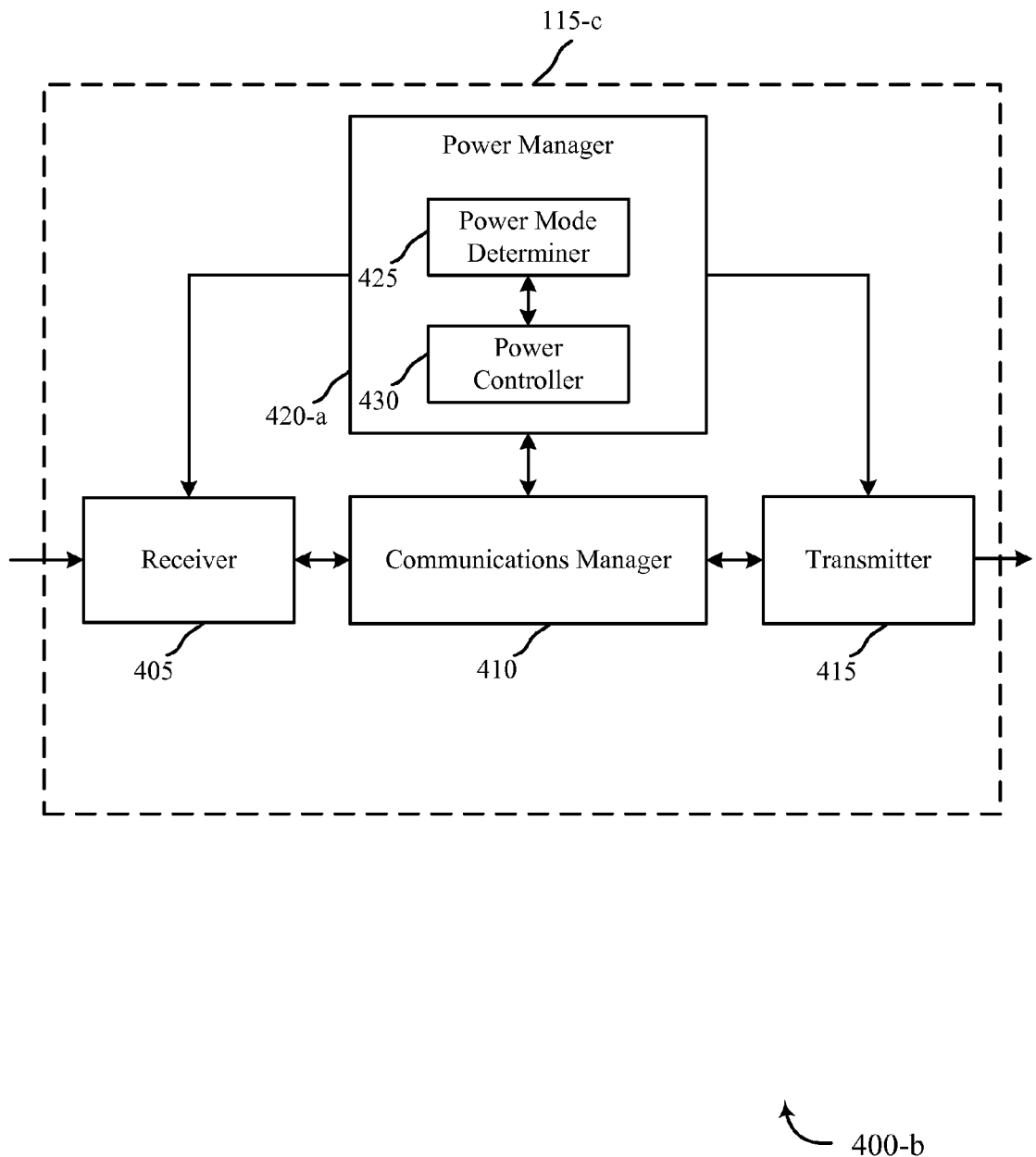
FIG. 4B shows a block diagram of another example of a wireless communication device.

FIG. 4B shows a block diagram 400-b that illustrates another wireless communication device 115-c (e.g., a WLAN station or LTE UE) may be configured to adaptively switch or transition between power modes in accordance with various embodiments. The device 115-c may be an example of various aspects of the stations 115 described with reference to FIGS. 1 and/or 4A, and may include circuitry such as described with respect to FIG. 3. The device 115-c, or portions thereof, may also be a processor. The device 115-c may include a receiver 405, a communications manager 410, a transmitter 415 and a power manager 420-a. Each of these components may be in communication with each other.

The components of the device 115-c may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 405, the communications manager 410 and the transmitter 415 may be configured as previously described with respect to FIG. 4A. The power manager 420-a may include a power mode determiner 425 and a power controller 430.

The power manager 420-a may be configured to perform the various functions to manage power modes of the device 115-c as described above with respect to FIG. 4A. In this example, the power manager 420-a may receive information from the communications manager 410 related to an operating mode of the device 115-c. The power manager 420-a may provide such information to the power mode determiner 425, which may determine a desired power mode using the provided information. The power mode determiner 425 may indicate the desired power mode for the device 115-c either to the power controller 430 or to the power manager 420-a, which may control or otherwise instruct the operations of the power controller 430. The power controller 430 may be configured to implement the desired power mode using various techniques, such as the techniques described above and/or techniques described below. In some embodiments, the power controller 430 may be configured to determine a power scheme in accordance with the desired power mode, and may cause the power manager 420-a to communicate with various components, such as the receiver 405, the communications manager 410 and the transmitter 415, to implement the determined power scheme.

Figure 5A:
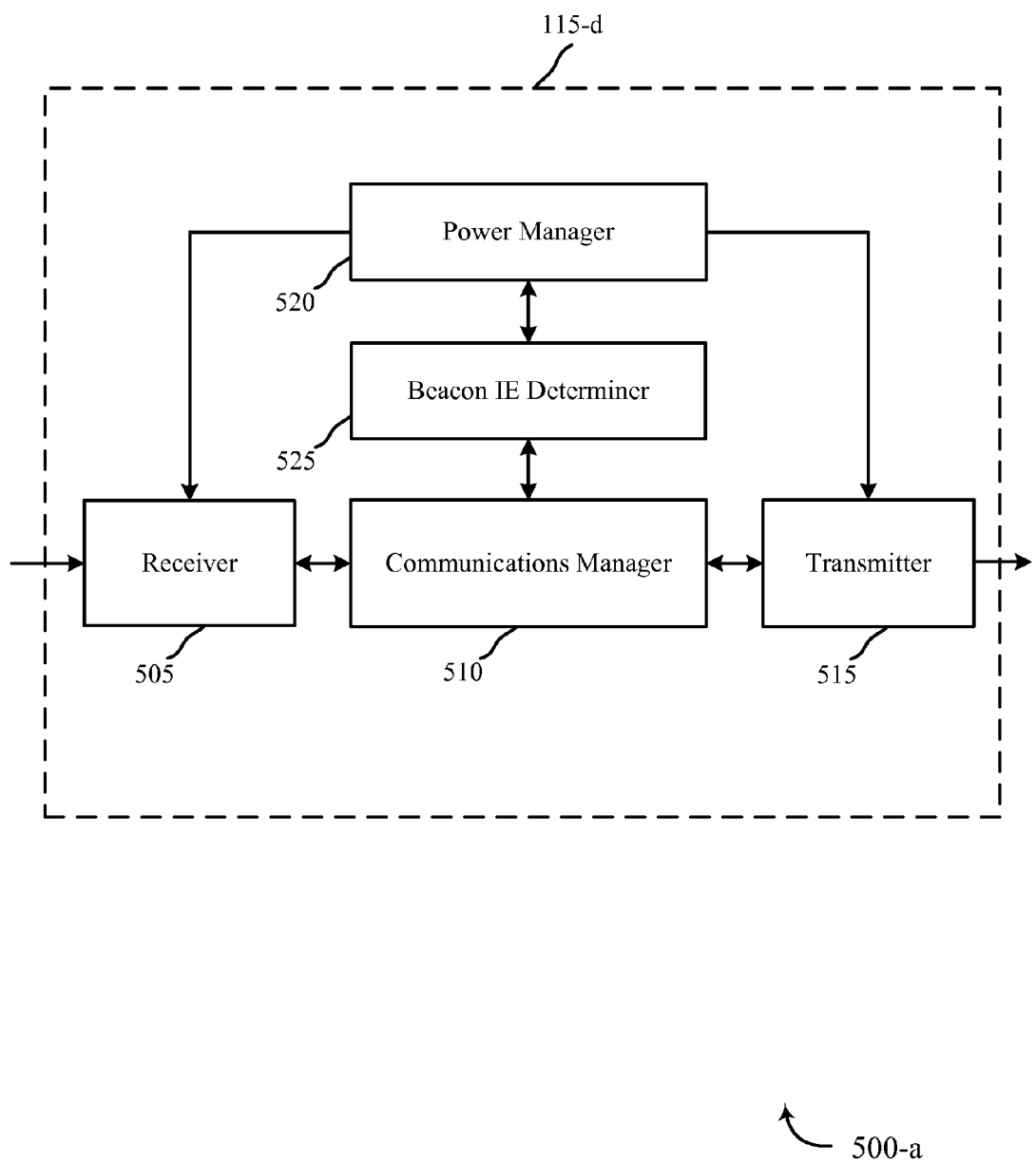
FIG. 5A shows a block diagram of an example of a wireless communication device that may implement adaptive control of power modes in a beacon monitoring or a DTIM mode.

FIG. 5A shows a block diagram 500-a that illustrates a wireless communication device 115-d (e.g., a WLAN station or LTE UE) that may implement adaptive control of power modes in a beacon monitoring or a DTIM mode. The device 115-d may be an example of various aspects of the stations 115 described with reference to FIGS. 1, 4A and/or 4B, and may include circuitry such as described with respect to FIG. 3. The device 115-d, or portions thereof, may also be a processor. The device 115-d may include a receiver 505, a communications manager 510, a transmitter 515, a power manager 520 and a beacon IE determiner 525. Each of these components may be in communication with each other.

The components of the device 115-d may, individually or collectively, be implemented with an application-specific integrated circuit (ASIC) adapted to perform some or all of the applicable functions in hardware. Alternatively, the functions may be performed by a processing unit (or core), on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 505, the communications manager 510, the transmitter 515 and the power manager 520 may be configured as previously described with respect to FIGS. 4A and/or 4B. Further, in this example, the receiver 505 may be means for receiving a beacon or a portion thereof as noted above. The receiver 505 may be configured to receive the beacon (or portion) under control of the communications manager 510. The communications manager 510 may determine that the device 115-d in a DTIM mode, for example. The communications manager 510 may be configured to communicate the DTIM mode to the power manager 520, which may then implement power modes corresponding to the network sleep mode of the device 115-d and corresponding to the device 115-d waking up to receive a beacon from an AP, such as described above with respect to FIGS. 2A and/or 2B. Thus, the power manager 520 may implement a low power mode in which the device 115-d receives a portion of the anticipated beacon via the receiver 505.

The communications manager 510 may provide the received beacon (or portion) to the beacon IE determiner 525. The beacon IE determiner 525 may be configured to identify an IE in the received beacon (or portion) and to determine a value or status of the identified IE. Alternatively, the communications manager 510 may be configured to provide the relevant IE(s) to the beacon IE determiner 525 for the determiner 525 to determine the value or status of the relevant IE(s).

In some embodiments, the relevant IE(s) in the beacon (or portion) may include a traffic indication bit, such as a DTIM bit and/or a TIM bit. Thus, the beacon IE determiner 525 may be configured to identify the traffic indication bit(s), for example, as a DTIM bit or a TIM bit, and to determine whether the traffic indication bit(s) is/are set. The beacon IE determiner 525 may inform the power manager 520 that a traffic indication bit in the received beacon (or portion) is set, e.g., the DTIM bit is set, the TIM bit is set or both are set. As described above with respect to FIGS. 2A and/or 2B, the power manager 520 may adaptively switch or transition from the low power mode (implemented for receiving the beacon) to a high power mode (higher than the low power mode, and possibly a highest power mode of the device 115-d as appropriate or desired). That is, the power manager 520 may switch/transition the power mode of the device 115-d into the high power mode for receiving CAB traffic when the DTIM bit is set and/or for transmitting a PS-Poll or a null data frame when the TIM bit is set.

Figure 5B:
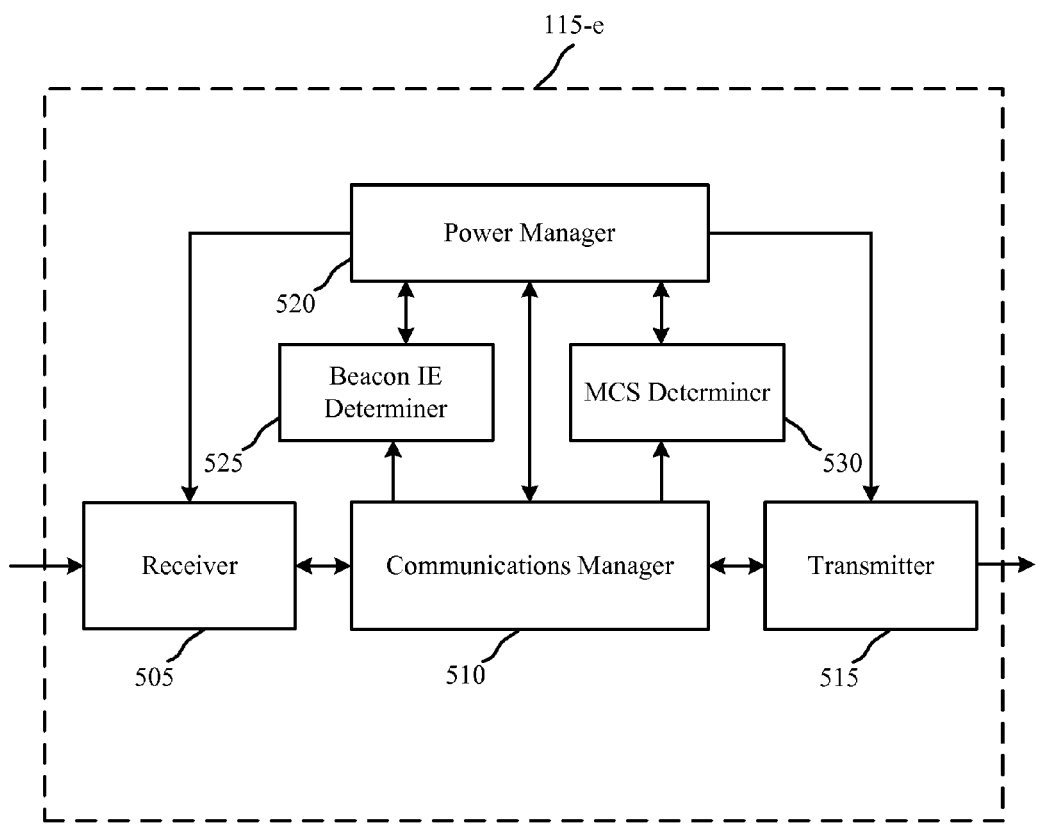
FIG. 5B shows a block diagram of another example of a wireless communication device that may implement adaptive control of power modes in a beacon monitoring or a DTIM mode.

FIG. 5B shows a block diagram 500-b that illustrates another wireless communication device 115-e (e.g., a WLAN station or LTE UE) that may implement adaptive control of power modes in a beacon monitoring or a DTIM mode. The device 115-e may be an example of various aspects of the stations 115 described with reference to FIGS. 1, 4A, 4B and/or 5A, and may include circuitry such as described with respect to FIG. 3. The device 115-e, or portions thereof, may also be a processor. The device 115-e may include a receiver 505, a communications manager 510, a transmitter 515, a power manager 520, a beacon IE determiner 525 and an MCS determiner 530. Each of these components may be in communication with each other.

The components of the device 115-*e* may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 505, the communications manager 510, the transmitter 515, the power manager 520 and the beacon IE determiner 525 may be configured as previously described with respect to FIGS. 4A, 4B and/or 5A. As described above, the receiver 505 may be configured to receive the beacon (or portion) under control of the communications manager 510; the communications manager 510 may determine that the device 115-*e* in a DTIM mode and may communicate the DTIM mode to the power manager 520; and, the power manager 520 may implement corresponding power modes of the device 115-*e* (e.g., for network sleep and for waking up to receive a beacon). Thus, the power manager 520 may implement a low power mode in which the device 115-*e* receives a portion of the anticipated beacon via the receiver 505.

The beacon IE determiner 525 may receive the beacon or the relevant IE(s) thereof, and may identify the relevant IE(s) and/or determine a value or status of the identified IE(s). When the relevant IE(s) include a traffic indication bit, such as a DTIM bit and/or a TIM bit, the beacon IE determiner 525 may identify the traffic indication bit(s), for example, as a DTIM bit or a TIM bit, and determine whether the traffic indication bit(s) is/are set. The beacon IE determiner 525 may inform the power manager 520 regarding the set traffic indication bit(s) as described above with respect to FIG. 5A. The power manager 520 may then switch/transition from the low power mode to a high power mode for receiving CAB traffic when the DTIM bit is set.

In this example, when the TIM bit is set the power manager 520 may not automatically switch/transition from the low power mode to the high power mode for transmitting a PS-Poll or a null data frame. Instead, the power manager 520 may take into account an MCS value of a recent reception of data from the AP 105 associated with the received beacon. For example, the MCS determiner 530 may identify or otherwise determine the MCS value of a most recent reception of data from the AP 105 associated with the received beacon. Further, the MCS determiner 530 may determine a compatibility of the identified/determined MCS value with a desired low power mode, such as the low power mode used for receiving the beacon, and inform the power manager 520 of the compatibility determination. When the identified/determined MCS value is determined to be compatible with the desired low power mode, the power manager 520 may implement the desired low power mode for the device 115-*e*. Then, the transmitter 515 under control of the communications manager 510, for example, may transmit a PS-Poll in the implemented low power mode. When the identified/determined MCS value is determined to be incompatible with the desired low power mode, the power manager 520 may implement the high power mode for the device 115-*e* for transmission of the PS-Poll, as discussed above.

Figure 6A:
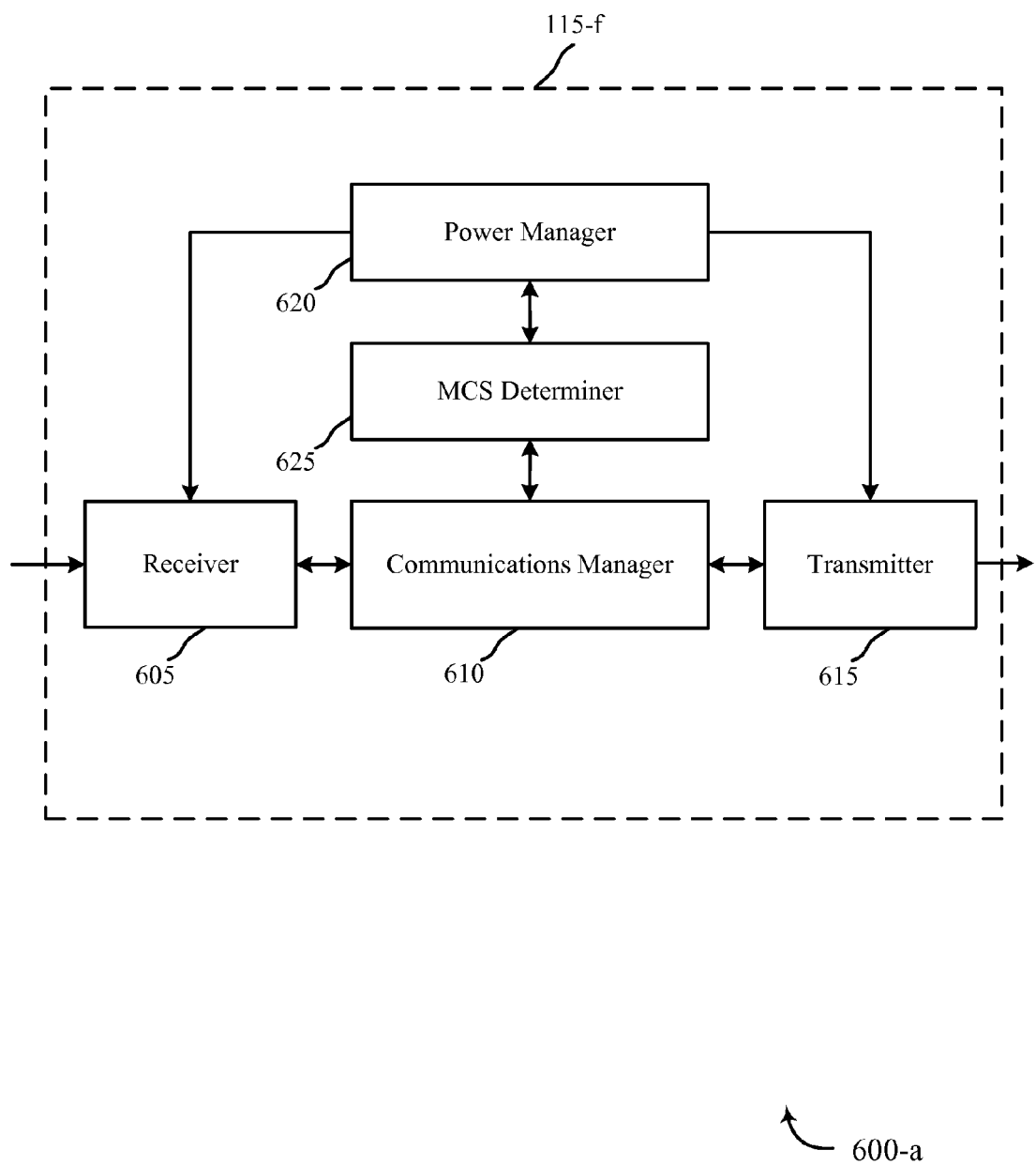
FIG. 6A shows a block diagram of an example of a wireless communication device that may implement adaptive control of power modes in a transmission mode.

FIG. 6A shows a block diagram 600-*a* that illustrates a wireless communication device 115-*f* (e.g., a WLAN station or LTE UE) that may implement adaptive control of power modes in a transmission mode. The device 115-*f* may be an example of various aspects of the stations 115 described with reference to FIGS. 1, 4A, 4B, 5A and/or 5B, and may include circuitry such as described with respect to FIG. 3. The device 115-*f*, or portions thereof, may also be a processor. The device 115-*f* may include a receiver 605, a communications manager 610, a transmitter 615, a power manager 620 and an MCS determiner 625. Each of these components may be in communication with each other.

The components of the device 115-*f* may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 605, the communications manager 610, the transmitter 615 and the power manager 620 may be configured as previously described with respect to FIGS. 4A, 4B, 5A and/or 5B. Further, in this example, communications manager 610 may be means for determining that a frame is to be transmitted. The communications manager 610 may identify the frame to be transmitted to the MCS determiner 625, which may then identify or otherwise determine an MCS value of the identified frame. Further, the MCS determiner 625 may determine a compatibility of the identified/determined MCS value with a desired low power mode, such as the low power mode used for receiving the beacon, and inform the power manager 620 of the compatibility determination. When the identified/determined MCS value is determined to be compatible with the desired low power mode, the power manager 620 may implement the desired low power mode for the device 115-*f*. Then, the transmitter 615 under control of the communications manager 610, for example, may transmit the frame in the implemented low power mode. When the identified/determined MCS value is determined to be incompatible with the desired low power mode, the power manager 620 may implement a high power mode, such as the high power mode for transmission of the PS-Poll discussed above, for the device 115-*f* to transmit the frame.

Figure 6B:
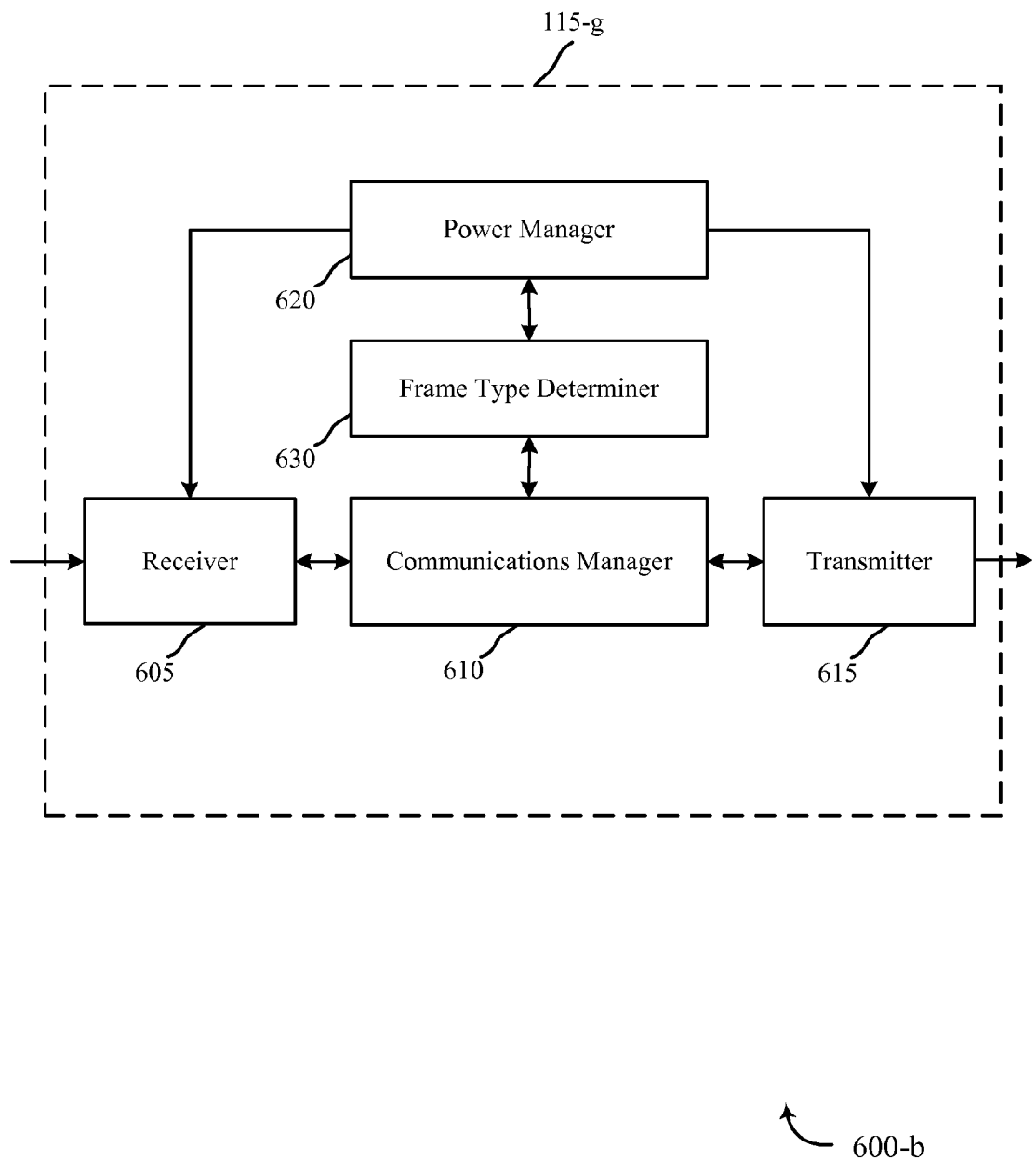
FIG. 6B shows a block diagram of another example of a wireless communication device that may implement adaptive control of power modes in a transmission mode.

FIG. 6B shows a block diagram 600-*b* that illustrates another wireless communication device 115-*g* (e.g., a WLAN station or LTE UE) that may implement adaptive control of power modes in a transmission mode. The device 115-*g* may be an example of various aspects of the stations 115 described with reference to FIGS. 1, 4A, 4B, 5A, 5B and/or 6A, and may include circuitry such as described with respect to FIG. 3. The device 115-*g*, or portions thereof, may also be a processor. The device 115-*g* may include a receiver 605, a communications manager 610, a transmitter 615, a power manager 620 and a frame type determiner 630. Each of these components may be in communication with each other.

The components of the device 115-*g* may, individually or collectively, be implemented with an application-specific integrated circuit (ASIC) adapted to perform some or all of the applicable functions in hardware. Alternatively, the functions may be performed by a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 605, the communications manager 610, the transmitter 615 and the power manager 620 may be configured as previously described with respect to FIGS. 4A, 4B, 5A, 5B and/or 6A. Further, in this example, communications manager 610 may be means for determining that a frame is to be transmitted. The communications manager 610 may identify the frame to be transmitted to the frame type determiner 630, which may then identify or otherwise determine a frame type of the identified frame. Further, the frame type determiner 630 may determine that the frame is to be transmitted in a desired low power mode, such as the low power mode used for receiving the beacon, when the determined frame type is a certain frame type (e.g., a management frame) or is one of several predefined frame types. The frame type determiner 630 then may inform the power manager 620 of the desired low power mode determination. Otherwise, the power manager 620 may proceed to implement a high power mode, such as the high power mode for transmission of the PS-Poll discussed above, for transmission of the frame, either automatically (e.g., after a predetermined elapse of time for the frame type determiner 630 to have completed its operations) or after an opposite notification (e.g., not a certain or predefined frame type) from the frame type determiner 630.

Alternatively or additionally, the frame type determiner 630 may determine a compatibility of the identified/determined frame type with the desired low power mode and inform the power manager 620 of the compatibility determination, such as discussed above with respect to FIG. 6A. When the identified/determined frame type is determined to be compatible with the desired low power mode, the power manager 620 may implement the desired low power mode for transmission of the frame. Otherwise, the power manager 620 may proceed to implement the high power mode for transmission of the frame, either automatically or after an opposite notification (e.g., not compatible) from the frame type determiner 630.

Figure 7:
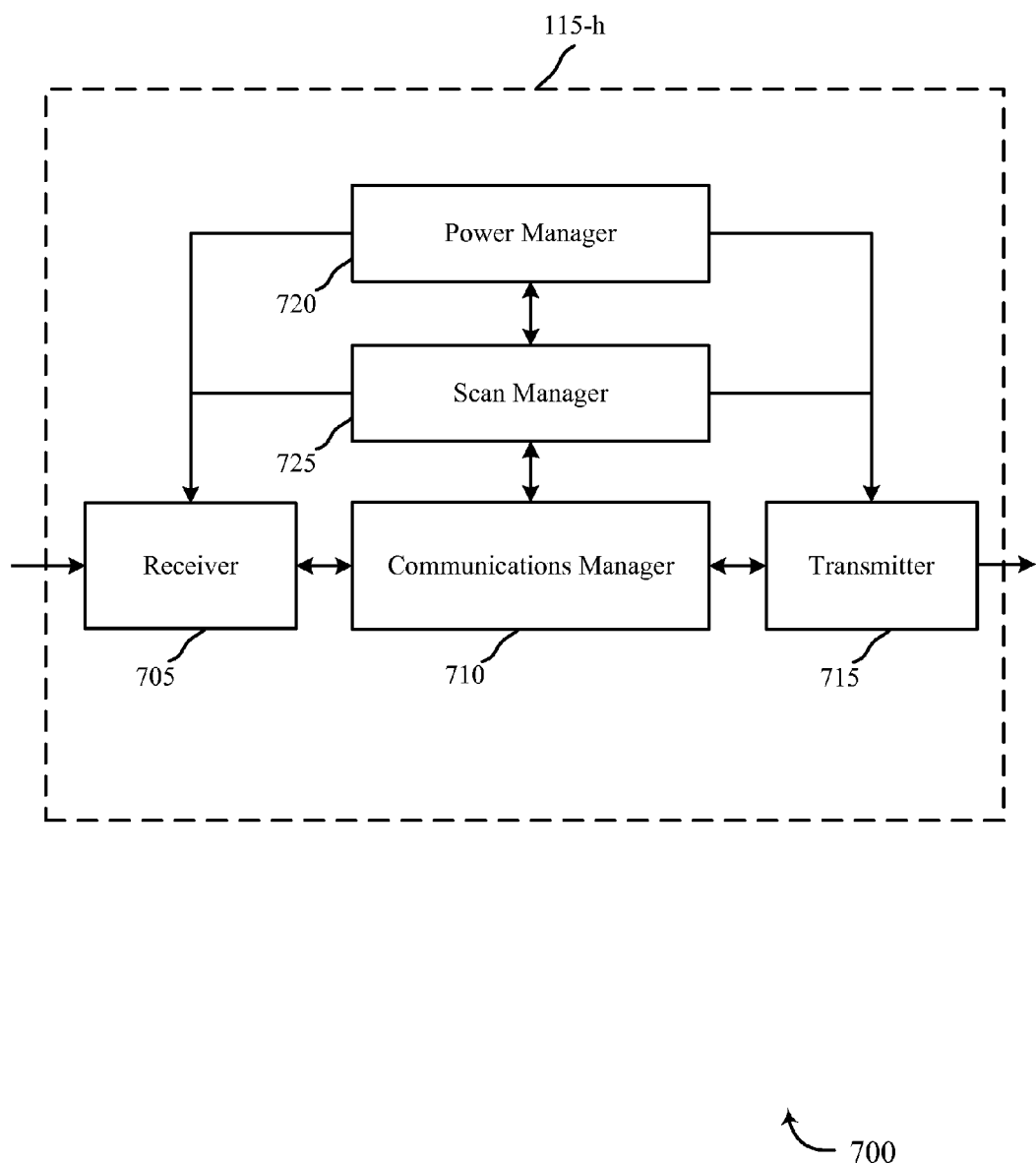
FIG. 7 shows a block diagram of an example of a wireless communication device that may implement adaptive control of power modes in a background scan mode.

FIG. 7 shows a block diagram 700 of a wireless communication device 115-*h* (e.g., a WLAN station or LTE UE) that may implement adaptive control of power modes in a background scan mode. The device 115-*h* may be an example of various aspects of the stations 115 described with reference to FIGS. 1, 4A, 4B, 5A, 5B, 6A and/or 6B, and may include circuitry such as described with respect to FIG. 3. The device 115-*h*, or portions thereof, may also be a processor. The device 115-*h* may include a receiver 705, a communications manager 710, a transmitter 715, a power manager 720 and a scan manager 725. Each of these components may be in communication with each other.

The components of the device 115-*h* may, individually or collectively, be implemented with an application-specific integrated circuit (ASIC) adapted to perform some or all of the applicable functions in hardware. Alternatively, the functions may be performed a processing unit (or core) on an integrated circuit. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions stored in a memory, formatted to be executed by a general or application-specific processor.

The receiver 705, the communications manager 710, the transmitter 715 and the power manager 720 may be configured as previously described with respect to FIGS. 4A, 4B, 5A, 5B, 6A and/or 6B. Further, in this example, communications manager 710 may be means for determining that a background scan is to be performed, e.g., the device 115-*h* is to enter a background scan mode. In such case, the communications manager 710 may inform the scan manager 725 that a background scan is to be performed and may inform the power manager 720 to switch/transition the device 115-*h* into a desired low power mode, such as the low power mode for receiving the beacon, for the background scan. Alternatively, the scan manager 725 may determine that a background scan is to be performed, inform the communications manager 710 as such, and inform the power manager 720 to switch/transition the device 115-*h* into the desired low power mode for the background scan.

In either case, the power manager 720 may implement the desired low power mode, for example, by placing components of the device 115-*h* that are involved in performing the background scan (e.g., the scan manager 725, the transmitter 715 and/or the receiver 705) in the desired low power mode. Other components not involved in performing the background scan also may be placed in the desired low power mode or even turned off, as appropriate or desired. When the background scan is completed, the scan manager 725 may inform the power manager 720, which then may switch/transition the device 115-*h* to a different power mode, for example, according to current circumstances of the device 115-*h*.

The background scan described above and further below may be a WLAN scan for nearby APs 105 with which the device 115-*h* may communicate, for example, when a connection with the current AP 105 is lost (e.g., a handover may occur when the device 115-*h* moves out of range of the current AP 105 or another nearby AP 105 may provide better quality of service). Alternatively or additionally, the background scan may an LTE scan, for example, for neighboring devices 115 with which the device 115-*h* may communicate, or for nearby base stations 135.

Figure 8:
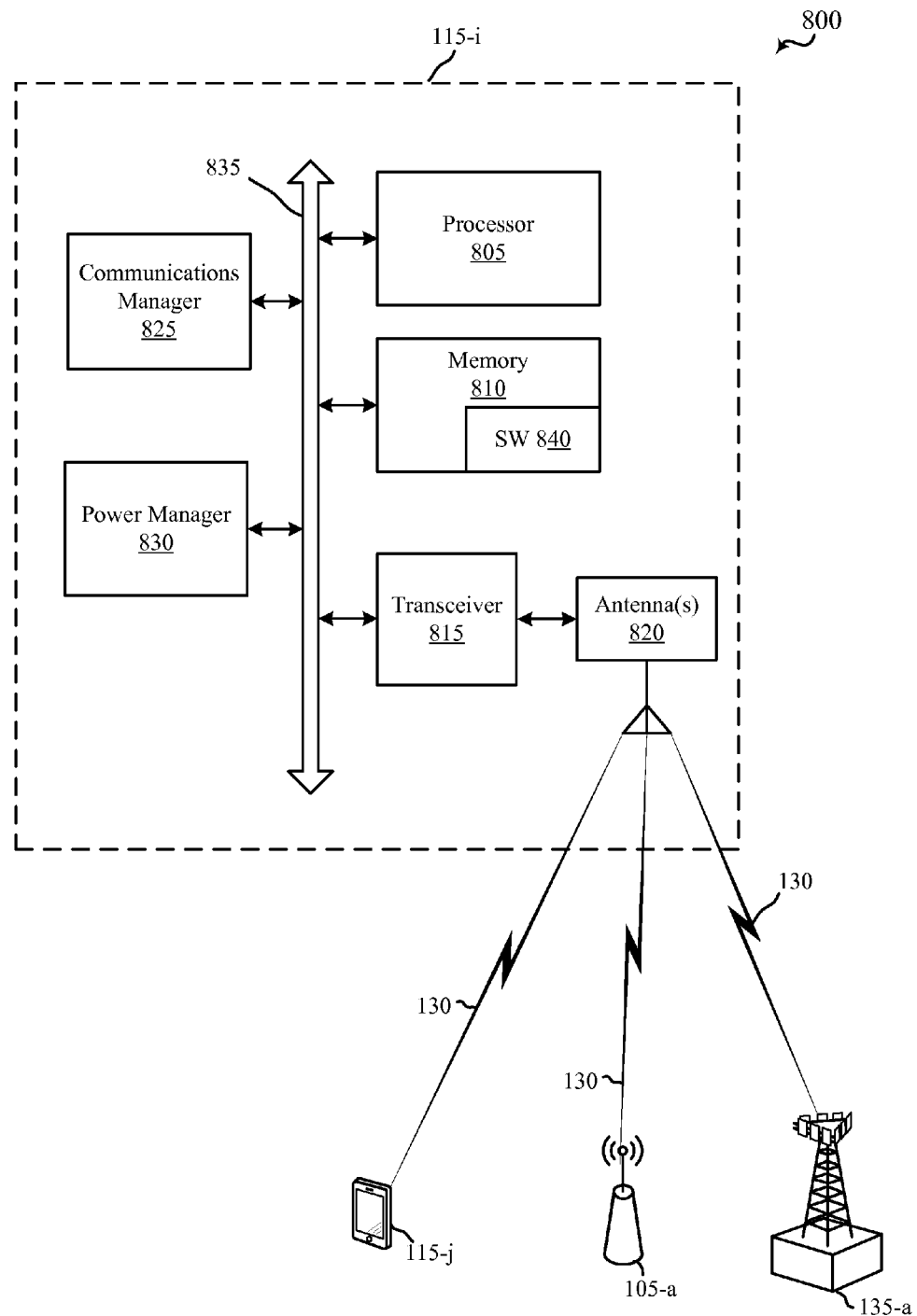
FIG. 8 shows a block diagram of an example of a wireless communication device architecture according to various embodiments.

Turning to FIG. 8, a block diagram 800 illustrates an architecture of a wireless communication device 115-*i* (e.g., a WLAN station or LTE UE) according to various embodiments. The device (e.g., station) 115-*i* may have various other configurations and may be included in or be part of a personal computer (e.g., laptop computer, netbook computer, tablet computer, etc.), a cellular telephone, a PDA, a digital video recorder (DVR), an internet appliance, a gaming console, an e-reader, etc. The device 115-*i* may have an internal power supply (not shown), such as a small battery, to facilitate mobile operation. The device 115-*i* may be an example of the devices/stations 115 of FIGS. 1, 3A, 3B, 4A, 4B, 5A, 5B, 6A, 6B and/or 7.

The device 115-*i* may include a processor 805, a memory 810, a transceiver module 815, antenna(s) 820, a communications manager 825 and a power manager 830. The power manager 830 may be an example of the power manager 420, 420-*a*, 520, 620 and/or 720 of FIGS. 4A, 4B, 5A, 5B, 6A, 6B and/or 7, respectively. Each of these components may be in communication with each other, directly or indirectly, over a bus 835 for example.

The memory 810 may include RAM and/or ROM. The memory 810 may store computer-readable, computer-executable software (SW) code 840 containing instructions that are configured to, when executed, cause the processor 805 to perform various functions described herein for power mode control. Alternatively, the software code 840 may not be directly executable by the processor 805 but be configured to cause a computer (e.g., when compiled and executed) to perform functions described herein.

The processor 805 may include an intelligent hardware device, e.g., a CPU, a microcontroller, an ASIC, etc. The processor 805 may process information received through the transceiver module 815 and/or to be sent to the transceiver module 815 for transmission through the antenna(s) 820. The processor 805 may handle, alone or in connection with the power manager 830 and or the communications manager 825, various aspects for adaptively controlling (switching, transitioning, etc.) power modes of the device 115-$i$ as described herein.

The transceiver module 815 may be configured to communicate bi-directionally with an AP 105-$a$, a base station 135-$a$ and/or another device (e.g., station) 115-$j$, each of which may be an example of the corresponding devices 105, 135 and 115 in FIG. 1. The transceiver module 815 may be implemented by a transmitter and a receiver. The transceiver module 815 may include a modem configured to modulate packets and provide the modulated packets to the antenna(s) 820 for transmission, and to demodulate packets received from the antenna(s) 820. While the device 115-$i$ may include a single antenna 820, there may be embodiments in which the device 115-$i$ may include multiple antennas 820.

The components of the device 115-$i$ may be configured to implement aspects discussed above with respect to FIGS. 1-7, and those aspects may not be repeated here for the sake of brevity. Moreover, the components of the device 115-$i$ may be configured to implement aspects discussed below with respect to FIGS. 9-14, and those aspects may not be repeated here also for the sake of brevity.

Figure 9:
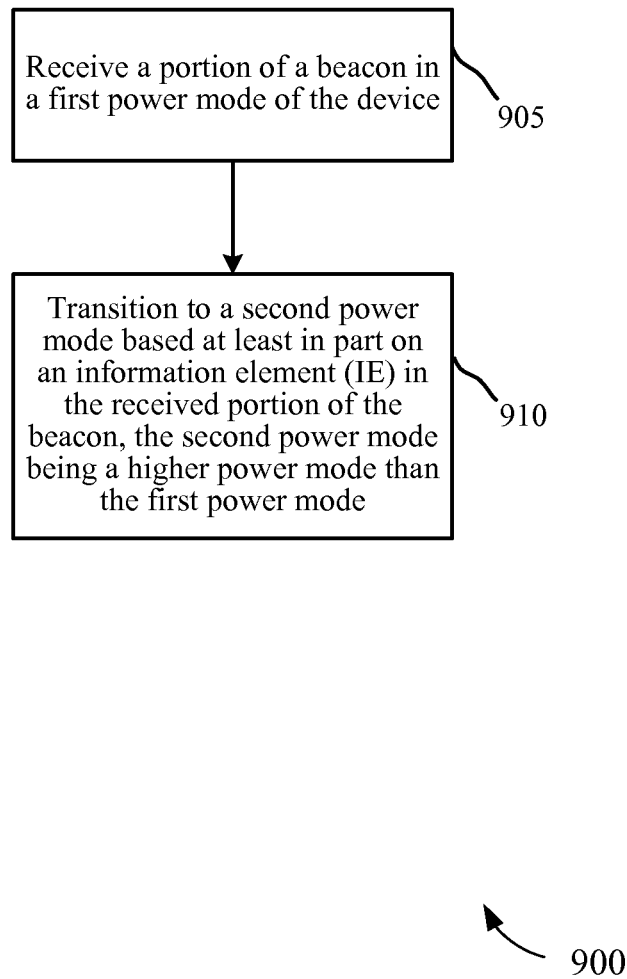
FIG. 9 is a flowchart of a method for implementing adaptive power control of a wireless communication device in a beacon monitoring mode or a DTIM mode.

Turning next to FIG. 9, a flowchart is illustrated of a method 900 for implementing adaptive power control in accordance with various embodiments. The method 900 may be implemented using, for example, the devices 115 of FIGS. 1, 4A, 4B, 5A, 5B, 6A, 6B, 7 and/or 8, for example. According to the method 900, the device 115 may be in a beacon monitoring mode or a DTIM mode. In one implementation, the communications manager 410, 510, 610, 710 and/or 825 described with reference to FIGS. 4A, 4B, 5A, 5B, 6A, 6B, 7 and/or 8, respectively, may be configured to execute a set of codes to control the functional elements of a device 115 to perform the functions described below.

At block 905, the device 115 may receive a beacon, or a portion of a beacon, in a first power mode. At block 910, the device 115 may transition to a second power mode based on an information element (IE) in the received beacon or the received portion thereof. According to the method 900, the second power mode may be a higher power mode than the first power mode. As such, as described above, the device 115 may implement a lower power mode for receiving a beacon (or portion), and may switch or transition from the lower power mode to a higher power mode when an IE in the beacon indicates that the higher power mode is appropriate, desired or needed (e.g., to meet certain error vector magnitude (EVM) requirements) for a subsequent operation of the device 115.

Therefore, the method 900 may be used to adaptively control power modes of the device so that a low power mode may be implemented for suitable (e.g., compatible) operations of the device 115, and the device transitions to a high power mode for appropriate operations of the device 115. Thus, the device 115 may implement various different power modes for a given mode of operation (e.g., DTIM mode) of the device, for example, using information related to the various functions that the device 115 may perform while in the given mode of operation. It should be noted that the method 900 is just one implementation and that other implementations are possible.

Figure 10:
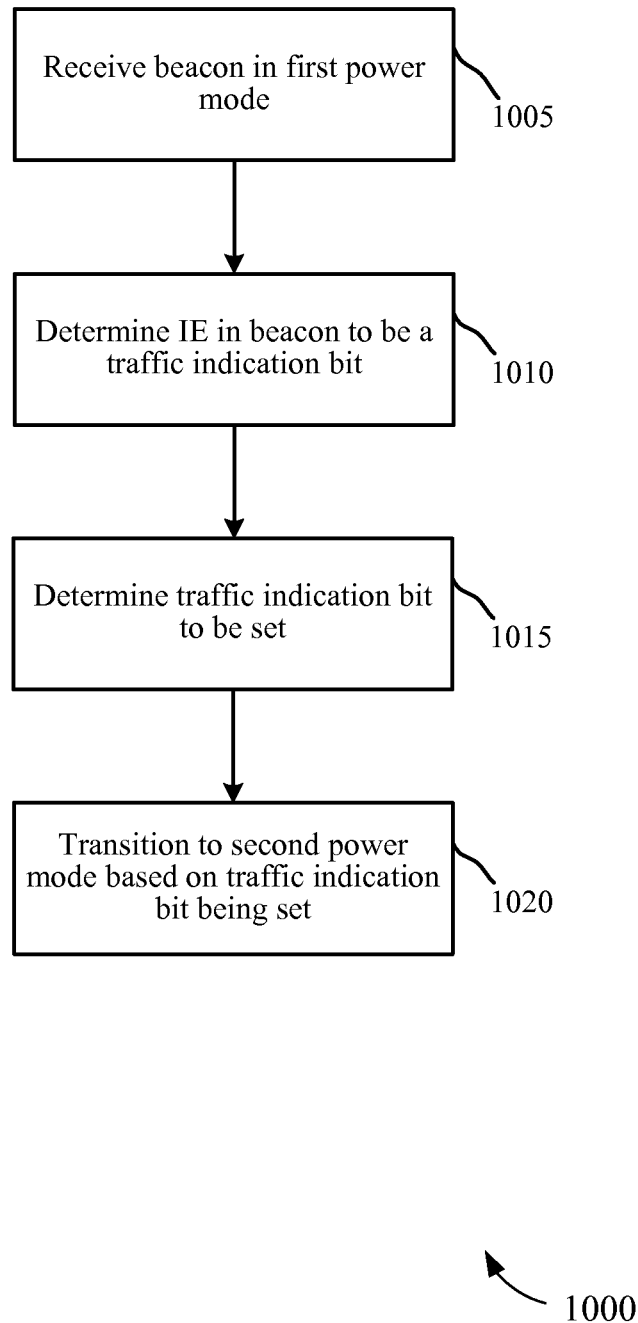
FIG. 10 is a flowchart of another method for implementing adaptive power control of a wireless communication device in a beacon monitoring or a DTIM mode.

FIG. 10 is a flowchart of another method 1000 for implementing adaptive power control in accordance with various embodiments. The method 1000 may be implemented using, for example, the devices 115 of FIGS. 1, 4A, 4B, 5A, 5B, 6A, 6B, 7 and/or 8, for example. According to the method 1000, the device 115 may be in a beacon monitoring mode or a DTIM mode. In one implementation, the communications manager 410, 510, 610, 710 and/or 825 described with reference to FIGS. 4A, 4B, 5A, 5B, 6A, 6B, 7 and/or 8, respectively, may be configured to execute a set of codes to control the functional elements of a device 115 to perform the functions described below.

At block 1005, the device 115 may receive a beacon, or a portion of a beacon, in a first power mode. As described above, the device 115 may be in a DTIM mode in which the device 115 may be in a sleep mode ignoring a periodic beacon transmitted from an AP 105. The device 115 may transition from the sleep mode to an awake mode periodically to listen for a beacon from the AP 105. When the device 115 wakes up, the device 115 may be in a first power mode, such as a lower power mode of the device (e.g., a LPRFA mode), for receiving the beacon. At block 1010, the device 115 may determine an IE in the received beacon (or portion) to be a traffic indication bit (e.g., DTIM bit and/or TIM bit). The device 115 may be configured to identify or otherwise determine a traffic indication bit in any suitable manner, such as by the location of the bit in the beacon or by an identifier for the bit. Next, at block 1015, the device 115 may determine that the traffic indication bit(s) is/are set (e.g., DTIM=1 and/or TIM=1). Determining that the traffic indication bit(s) is/are set may involve determining a value of the bit(s). Conventionally in the case of DTIM and TIM bits, the bit is set when the value is one and not set when the value is zero. Then, at block 1020, the device 115 may transition to a second power mode based on the traffic indication bit(s) being set. As described above, the device 115 may transition from a lower power mode to a higher power mode (e.g., an HPRFA mode) for receiving data associated with the beacon when the DTIM bit is set and/or for transmitting a PS-Poll or null data frame when the TIM bit is set.

According to the method 1000, the second power mode may be a higher power mode than the first power mode. As such, as described above, the device 115 may implement a lower power mode for receiving a beacon (or portion), and may switch or transition from the lower power mode to a higher power mode when a traffic indication bit in the beacon is set. As described above, for example, a DTIM bit being set and/or a TIM bit being set in the beacon may indicate that certain impending operations or functions of the device (e.g., receiving CAB traffic, transmitting a PS-Poll or a null data frame, etc.) may be performed better in the higher power mode. In general, an IE in the beacon may indicate that the higher power mode is appropriate, desired or needed (e.g., to meet certain error vector magnitude (EVM) requirements) for a subsequent operation of the device 115.

Therefore, the method 1000 also may be used to adaptively control power modes of the device so that a low power mode may be implemented for suitable (e.g., compatible) operations of the device 115, and the device transitions to a high power mode for appropriate operations of the device 115. Thus, the device 115 may implement various different power modes for a given mode of operation (e.g., DTIM mode) of the device, for example, using traffic indication bits related to the various functions that the device 115 may perform while in the given mode of operation. It should be noted that the method 1000 is just one implementation and that other implementations are possible.

Figure 11:
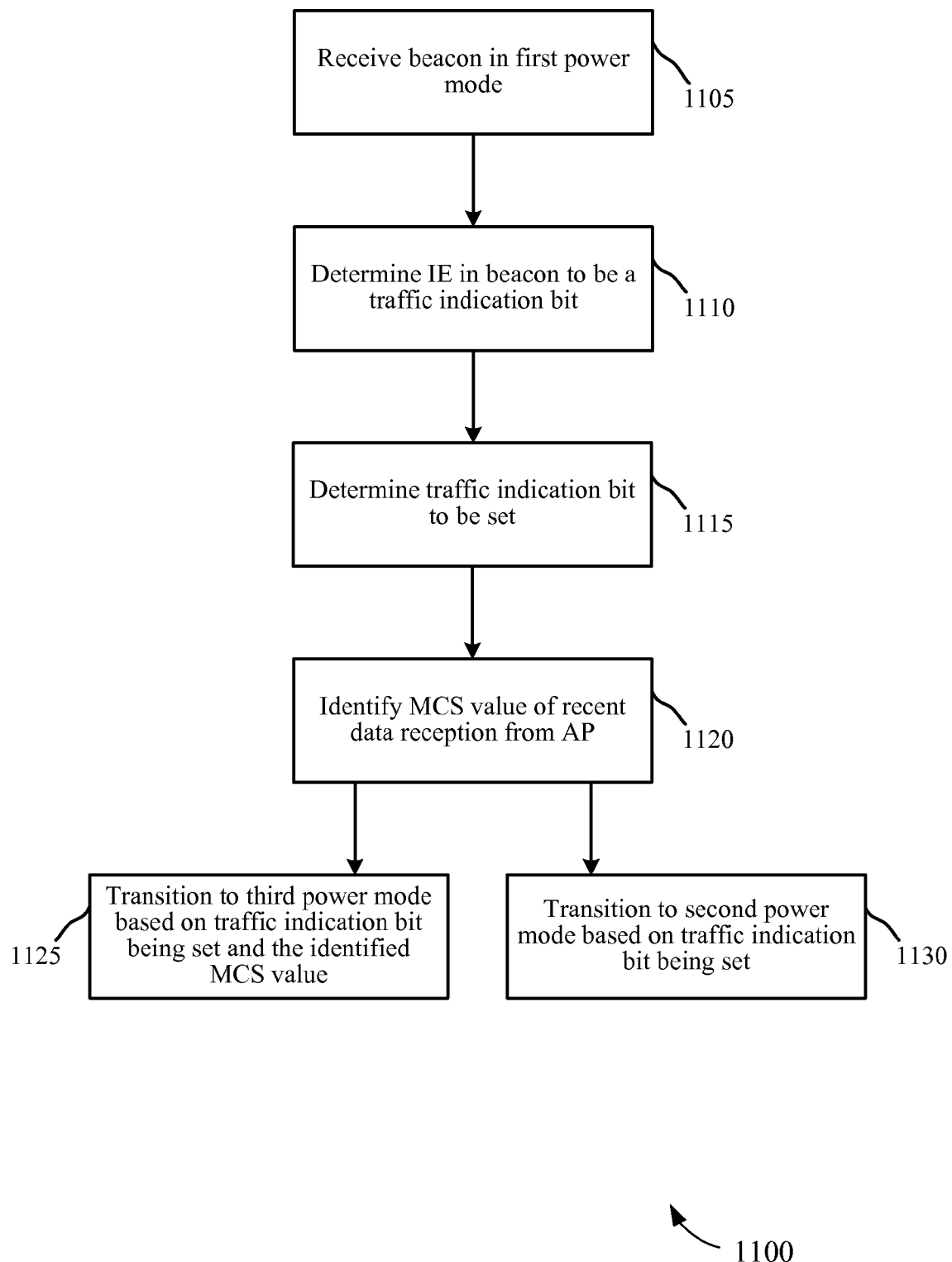
FIG. 11 is a flowchart of a yet another method for implementing adaptive power control of a wireless communication device in a beacon monitoring or a DTIM mode.

FIG. 11 is a flowchart of another method 1100 for implementing adaptive power control in accordance with various embodiments. The method 1100 may be implemented using, for example, the devices 115 of FIGS. 1, 4A, 4B, 5A, 5B, 6A, 6B, 7 and/or 8, for example. According to the method 1100, the device 115 may be in a beacon monitoring mode or a DTIM mode. In one implementation, the communications manager 410, 510, 610, 710 and/or 825 described with reference to FIGS. 4A, 4B, 5A, 5B, 6A, 6B, 7 and 8, respectively, may be configured to execute a set of codes to control the functional elements of a device 115 to perform the functions described below.

At block 1105, the device 115 may receive a beacon, or a portion of a beacon, in a first power mode. At block 1110, the device 115 may determine an IE in the received beacon to be a traffic indication bit. Next, at block 1115, the device 115 may determine that the traffic indication bit(s) is/are set. The operations at blocks 1105, 1110 and 1115 may be performed as described above with respect to FIG. 10, for example.

Next, at block 1120, the device 115 may identify or otherwise determine an MCS value of a recent (e.g., most recent) reception of data from the AP 105 associated with the received beacon. The method 1100 may proceed to block 1125 where, based on the traffic indication bit(s) being set and the identified MCS value, the device 115 may transition from the first (low) power mode to a third power mode. The identified MCS value may be compatible with the third power mode such that the operation(s) to be performed by the device 115 as indicated by the traffic indication bit(s) being set (e.g., PS-Poll transmission) may be performed in the third power mode. The third power mode may be a lower power mode than a second power mode to which the device 115 may transition but for the identified MCS value being compatible with the third power mode. That is, if the identified MCS value is not compatible with the third power mode, the method may proceed to block 1130 instead of block 1125. At block 1130, the device may transition to the second power mode based on the traffic indication bit(s) being set.

According to the method 1100, the second power mode may be a higher power mode than the third power mode, which may be a higher power mode than the first power mode. As such, as described above, the device 115 may implement a lower power mode for receiving a beacon (or portion), and may switch or transition from the lower power mode to a higher power mode when a traffic indication bit in the beacon is set. The particular higher power mode to transition to may be determined using the MCS value of a recent data reception from the AP 105 associated with the received beacon.

Therefore, the method 1100 also may be used to adaptively control power modes of the device so that a low power mode may be implemented for suitable (e.g., compatible) operations of the device 115, and the device transitions to a high power mode determined based on a traffic bit being set and another parameter, such as the identified MCS value. Thus, the device 115 may implement various different power modes for a given mode of operation (e.g., DTIM mode) of the device, for example, using traffic indication bits related to the various functions that the device 115 may perform while in the given mode of operation and using an MCS value. It should be noted that the method 1100 is just one implementation and that other implementations are possible.

Figure 12:
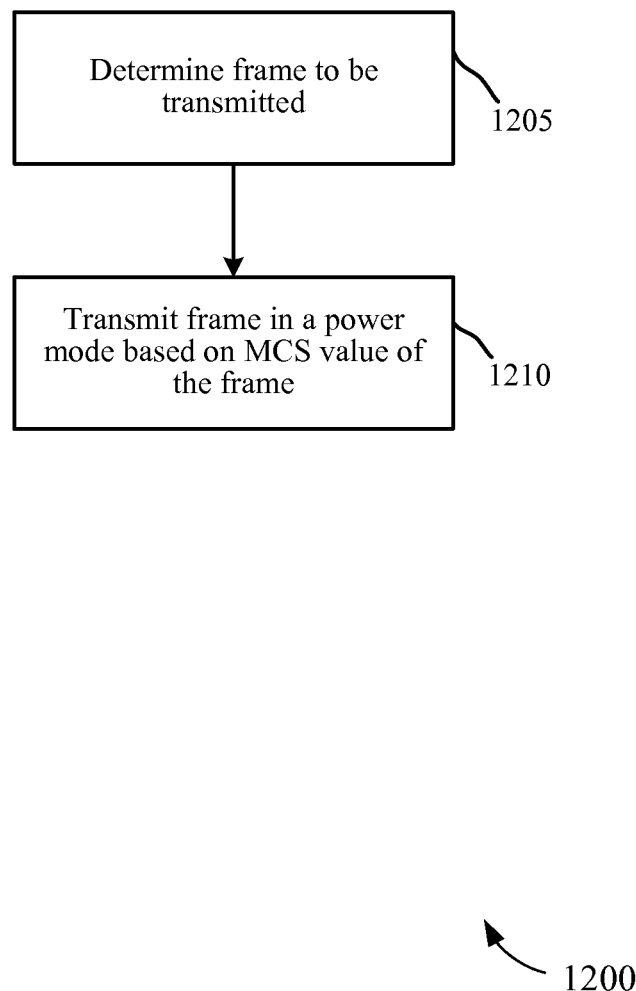
FIG. 12 is a flowchart of a method for implementing adaptive power control of a wireless communication device in a transmission mode.

FIG. 12 is a flowchart of a method 1200 for implementing adaptive power control in accordance with various embodiments. The method 1200 may be implemented using, for example, the devices 115 of FIGS. 1, 4A, 4B, 5A, 5B, 6A, 6B, 7 and/or 8, for example. According to the method 1200, the device 115 may be in a transmission mode. In one implementation, the communications manager 410, 510, 610, 710 and/or 825 described with reference to FIGS. 4A, 4B, 5A, 5B, 6A, 6B, 7 and 8, respectively, may be configured to execute a set of codes to control the functional elements of a device 115 to perform the functions described below.

At block 1205, the device 115 may determine that a frame is to be transmitted. Then, at block 1210, the device 115 may transmit the frame in a power mode that is based on an MCS value of the frame. As such, the device 115 may implement a suitable power mode for transmitting the frame based on the MCS value of the frame. This may allow the device 115 to use a lower power mode for transmitting the frame than may have been used without considering the MCS value of the frame, thus reducing power consumption for frame transmission in some cases.

Therefore, the method 1200 may be used to adaptively control power modes of the device so that an appropriate (e.g., low) power mode may be implemented for transmitting a frame. Thus, the device 115 may implement various different power modes for a given mode of operation (e.g., transmission mode) of the device, for example, using the MCS value of the frame to be transmitted. It should be noted that the method 1200 is just one implementation and that other implementations are possible.

Figure 13:
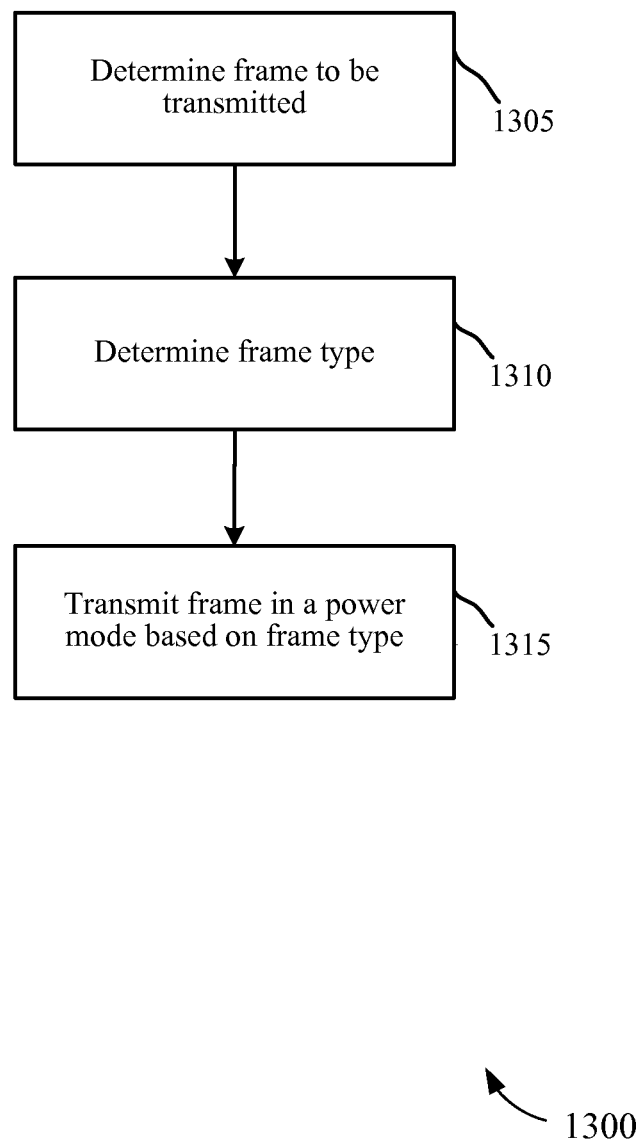
FIG. 13 is a flowchart of another method for implementing adaptive power control of a wireless communication device in a transmission mode.

FIG. 13 is a flowchart of another method 1300 for implementing adaptive power control in accordance with various embodiments. The method 1300 may be implemented using, for example, the devices 115 of FIGS. 1, 4A, 4B, 5A, 5B, 6A, 6B, 7 and/or 8, for example. According to the method 1300, the device 115 may be in a transmission mode. In one implementation, the communications manager 410, 510, 610, 710 and/or 825 described with reference to FIGS. 4A, 4B, 5A, 5B, 6A, 6B, 7 and 8, respectively, may be configured to execute a set of codes to control the functional elements of a device 115 to perform the functions described below.

At block 1305, the device 115 may determine that a frame is to be transmitted. Next, at block 1310, the device 115 may identify or otherwise determine a frame type (e.g., management frame) of the frame to be transmitted. Then, at block 1315, the device 115 may transmit the frame in a power mode that is based on the determined frame type. As such, the device 115 may implement a suitable power mode for transmitting the frame based on the frame type of the frame. This may allow the device 115 to use a lower power mode for transmitting the frame than may have been used without considering the frame type, thus reducing power consumption for frame transmission in some cases.

Therefore, the method 1300 may be used to adaptively control power modes of the device so that an appropriate (e.g., low) power mode may be implemented for transmitting a frame. Thus, the device 115 may implement various different power modes for a given mode of operation (e.g., transmission mode) of the device, for example, using the frame type of the frame to be transmitted. It should be noted that the method 1300 is just one implementation and that other implementations are possible.

Figure 14:
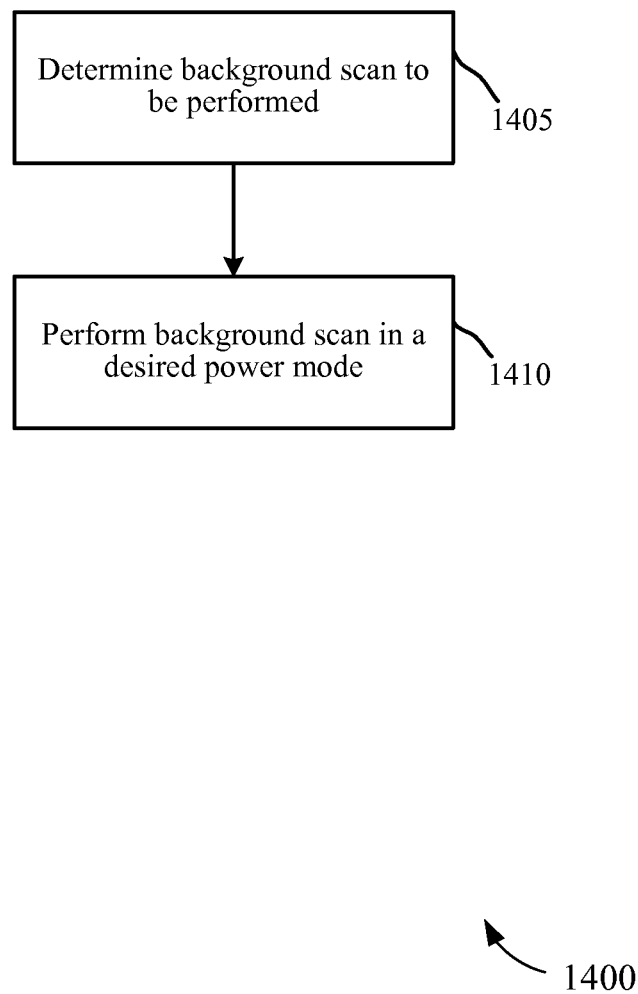
FIG. 14 is a flowchart of a method for implementing adaptive power control of a wireless communication device in a background scan mode.

FIG. 14 is a flowchart of another method for implementing adaptive power control in accordance with various embodiments. The method 1400 may be implemented using, for example, the devices 115 of FIGS. 1, 4A, 4B, 5A, 5B, 6A, 6B, 7 and/or 8, for example. According to the method 1400, the device 115 may be in a background scan mode. In one implementation, the communications manager 410, 510, 610, 710 and/or 825 described with reference to FIGS. 4A, 4B, 5A, 5B, 6A, 6B, 7 and 8, respectively, may be configured to execute a set of codes to control the functional elements of a device 115 to perform the functions described below.

At block 1405, the device 115 may determine that a background scan is to be performed. Then, at block 1410, the device 115 may perform the background scan in a power mode that is suitable for performing operations involved with the background scan. This may allow the device 115 to use a lower power mode for performing the background scan that may have been used without considering that the device 115 is or will be in the background scan mode.

Therefore, the method 1400 may be used to adaptively control power modes of the device so that an appropriate (e.g., low) power mode may be implemented for performing a background scan. Thus, the device 115 may implement various different power modes for a given mode of operation (e.g., background scan mode) of the device, for example, solely based on the given mode of operation. It should be noted that the method 1400 is just one implementation and that other implementations are possible. For example, various implementations may be obtained by combining features from a combination of methods 900, 1000, 1100, 1200, 1300 and/or 1400.

The techniques described herein may be used for the systems and radio technologies mentioned above as well as other systems and radio technologies. The description above, however, describes a WLAN system for purposes of example, and WLAN terminology is used in much of the description above, although the techniques are applicable beyond WLAN applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, a microprocessor in conjunction with a DSP core, or any other such configuration.

The functions described herein may be implemented in hardware, software executed by a processor, firmware, or any combination thereof. If implemented in software executed by a processor, the functions may be stored on or transmitted over an instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method of adaptive power control for a wireless communication device, comprising:
   receiving a first portion of a beacon in a first power mode of the device;
   determining whether to receive or ignore a second portion of the beacon based at least in part on a traffic indication bit in the received first portion of the beacon, wherein the first portion of the beacon and the second portion of the beacon are in a same continuous beacon frame transmission;
   determining that the traffic indication bit is set; and
   transitioning to a second power mode based at least in part on the determination that the traffic indication bit is set, wherein the second power mode is a higher receiving power mode than the first power mode and the transitioning is initiated upon determining that the traffic indication bit is set; and
   ignoring a remainder of the beacon after the traffic indication bit.

2. The method of claim 1, further comprising:
   receiving data in the second power mode of the device when the traffic indication bit is a delivery traffic indication message (DTIM) bit.

3. The method of claim 1, further comprising:
   transmitting a power save poll (PS-Poll) or a null data frame in the second power mode of the device when the traffic indication bit is a traffic indication map (TIM) bit.

4. The method of claim 1, further comprising:
   completing transition to the second power mode by an end of a distributed inter-frame space (DIFS) following a termination of the beacon.

5. The method of claim 1, further comprising:
   identifying a modulation and coding scheme (MCS) value of a most recent reception of data from an access point (AP) associated with the beacon; and
   transmitting a power save poll (PS-Poll) in a third power mode of the device when the identified MCS value is compatible with the third power mode and the traffic indication bit is a traffic indication map (TIM) bit, the third power mode being a lower power mode than the second power mode.

6. The method of claim 1, wherein the traffic indication bit comprises a delivery traffic indication message (DTIM) bit or a traffic indication map (TIM) bit.

7. The method of claim 1, wherein transitioning to the second power mode comprises:
   switching to a main synthesizer routed to each of a plurality of transmission/reception (Tx/Rx) chains associated with a modem for the second power mode from a plurality of local synthesizers routed respectively to one of the plurality of Tx/Rx chains for the first power mode.

8. The method of claim 1, wherein transitioning to the second power mode comprises:
   switching from a main synthesizer routed to each of a plurality of transmission/reception (Tx/Rx) chains associated with a modem for the first power mode to a plurality of local synthesizers routed respectively to one of the plurality of Tx/Rx chains for the second power mode.

9. The method of claim 1, further comprising:
   determining that a frame is to be transmitted by the device; and
   transmitting the frame in the first power mode of the device when a modulation and coding scheme (MCS) value of the frame is compatible with the first power mode.

10. The method of claim 9, further comprising:
    transmitting the frame in the second power mode of the device when the MCS value of the frame is not compatible with the first power mode.

11. The method of claim 1, further comprising:
    determining a frame type of a frame to be transmitted; and
    transmitting the frame in the first power mode of the device based on the determined frame type.

12. The method of claim 11, wherein the determined frame type comprises a management frame.

13. The method of claim 1, further comprising:
    performing a background scan in the first power mode of the device.

14. The method of claim 13, wherein performing the background scan in the first power mode comprises operating components of the device involved in the background scan in the first power mode.

15. The method of claim 1, further comprising:
    determining that the device is in a delivery traffic indication message (DTIM) mode.

16. A wireless communication device, comprising:
    a receiver configured to receive a first portion of a beacon in a first power mode of the device and determine whether to receive or ignore a second portion of the beacon based at least in part on a traffic indication bit in the first portion of the beacon, wherein the first portion of the beacon and the second portion of the beacon are in a same continuous beacon frame transmission;
    a beacon information element (IE) determiner configured to determine that the traffic indication bit is set; and
    a power controller configured to transition to a second power mode based at least in part on the determination that the traffic indication bit is set, wherein the second power mode is a higher power mode than the first power mode and the transitioning is initiated upon determining that the traffic indication bit is set;
    wherein the receiver is further configured to ignore a remainder of the beacon after the traffic indication bit.

17. The device of claim 16, wherein the receiver is further configured to:
    receive data in the second power mode of the device when the traffic indication bit is a delivery traffic indication message (DTIM) bit.

18. The device of claim 16, further comprising:
    a transmitter configured to transmit a power save poll (PS-Poll) or a null data frame in the second power mode of the device when the traffic indication bit is a traffic indication map (TIM) bit.

19. The device of claim 16, further comprising:
    a modulation and coding scheme (MCS) determiner configured to determine an MCS value of a most recent reception of data from an access point (AP) associated with the beacon; and
    a transmitter configured to transmit a power save poll (PS-Poll) in a third power mode of the device when the identified MCS value is compatible with the third power mode and the traffic indication bit is a traffic indication map (TIM) bit, the third power mode being a lower power mode than the second power mode.

20. An apparatus for adaptive power control for a wireless communication device, comprising:

means for receiving a first portion of a beacon in a first power mode of the device;

means for determining whether to receive or ignore a second portion of the beacon based at least in part on a traffic indication bit in the received first portion of the beacon, wherein the first portion of the beacon and the second portion of the beacon are in a same continuous beacon frame transmission;

means for determining that the traffic indication bit is set; and means for transitioning to a second power mode based at least in part on the determination that the traffic indication bit is set, wherein the second power mode is a higher power mode than the first power mode and the transitioning is initiated upon determining that the traffic indication bit is set; and means for ignoring a remainder of the beacon after the traffic indication bit.

21. The apparatus of claim 20, wherein the means for receiving the portion of the beacon is further configured to receive data in the second power mode of the device when the traffic indication bit is a delivery traffic indication message (DTIM) bit.

22. The apparatus of claim 20, further comprising:

means for transmitting a power save poll (PS-Poll) or a null data frame in the second power mode of the device when the traffic indication bit is a traffic indication map (TIM) bit.

23. The apparatus of claim 20, further comprising:

means for determining a modulation and coding scheme (MCS) value of a most recent reception of data from an access point (AP) associated with the beacon; and means for transmitting a power save poll (PS-Poll) in a third power mode of the device when the identified MCS value is compatible with the third power mode and the traffic indication bit is a traffic indication map (TIM) bit, the third power mode being a lower power mode than the second power mode.

24. A computer program product, comprising:

a non-transitory computer-readable medium including instructions stored thereon, the instructions being executable by a computer to:

receive a first portion of a beacon in a first power mode of a device;

determine whether to receive or ignore a second portion of the beacon based at least in part on a traffic indication bit in the received first portion of the beacon, wherein the first portion of the beacon and the second portion of the beacon are in a same continuous beacon frame transmission;

determine that the traffic indication bit is set; and transition to a second power mode based at least in part on the determination that the traffic indication bit is set, wherein the second power mode is a higher power mode than the first power mode and the transitioning is initiated upon determining that the traffic indication bit is set; and ignore a remainder of the beacon after the traffic indication bit.

\* \* \* \* \*